United States Patent
Roberts

(10) Patent No.: US 7,333,814 B2
(45) Date of Patent: Feb. 19, 2008

(54) METHOD OF ACCOMMODATING OVERLAPPING OR ADJACENT NETWORKS

(75) Inventor: Richard D. Roberts, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 939 days.

(21) Appl. No.: 10/379,998

(22) Filed: Mar. 6, 2003

(65) Prior Publication Data

US 2003/0199279 A1    Oct. 23, 2003

Related U.S. Application Data

(60) Provisional application No. 60/361,716, filed on Mar. 6, 2002, provisional application No. 60/417,657, filed on Oct. 11, 2002.

(51) Int. Cl.
*H04Q 7/20* (2006.01)
(52) U.S. Cl. .................. 455/455.2; 455/450; 455/522; 370/342; 370/352
(58) Field of Classification Search ............. 455/452.2, 455/450, 522, 67.1, 455.2; 370/338, 348, 370/342, 352; 375/132, 347
See application file for complete search history.

(56) References Cited

U.S. PATENT DOCUMENTS

| 5,822,315 | A | 10/1998 | de Seze et al. |
| 6,134,261 | A | 10/2000 | Ryan .......................... 375/141 |
| 6,215,991 | B1 | 4/2001 | Mou et al. .................. 455/410 |
| 6,940,932 | B2 * | 9/2005 | Henriksson ................. 375/347 |
| 7,092,428 | B2 * | 8/2006 | Chen et al. .................. 375/132 |
| 2001/0051530 | A1 * | 12/2001 | Shiotsu et al. .............. 455/522 |
| 2002/0114308 | A1 * | 8/2002 | Takano et al. .............. 370/342 |
| 2003/0126492 | A1 * | 7/2003 | Cavin ............................ 714/4 |

* cited by examiner

*Primary Examiner*—Joseph Feild
*Assistant Examiner*—Michael Vu

(57) ABSTRACT

A multiple step process is performed at a local wireless network to limit interference between the local wireless network and a remote wireless network. Initially, a set of code words is chosen for the local wireless network to encode data with that have good cross correlation properties. If these initial code words are not adequate to prevent interference, then the local wireless network will adjust its transmission parameters by either shifting the transmission phase of its signals or by changing the code words it uses. If altering the transmission parameters does not alleviate the interference problem, then the local wireless network attempts to locate the interfering remote network and merge with it. If the merger is not possible or is unsuccessful, then the interference limiting process fails.

11 Claims, 18 Drawing Sheets

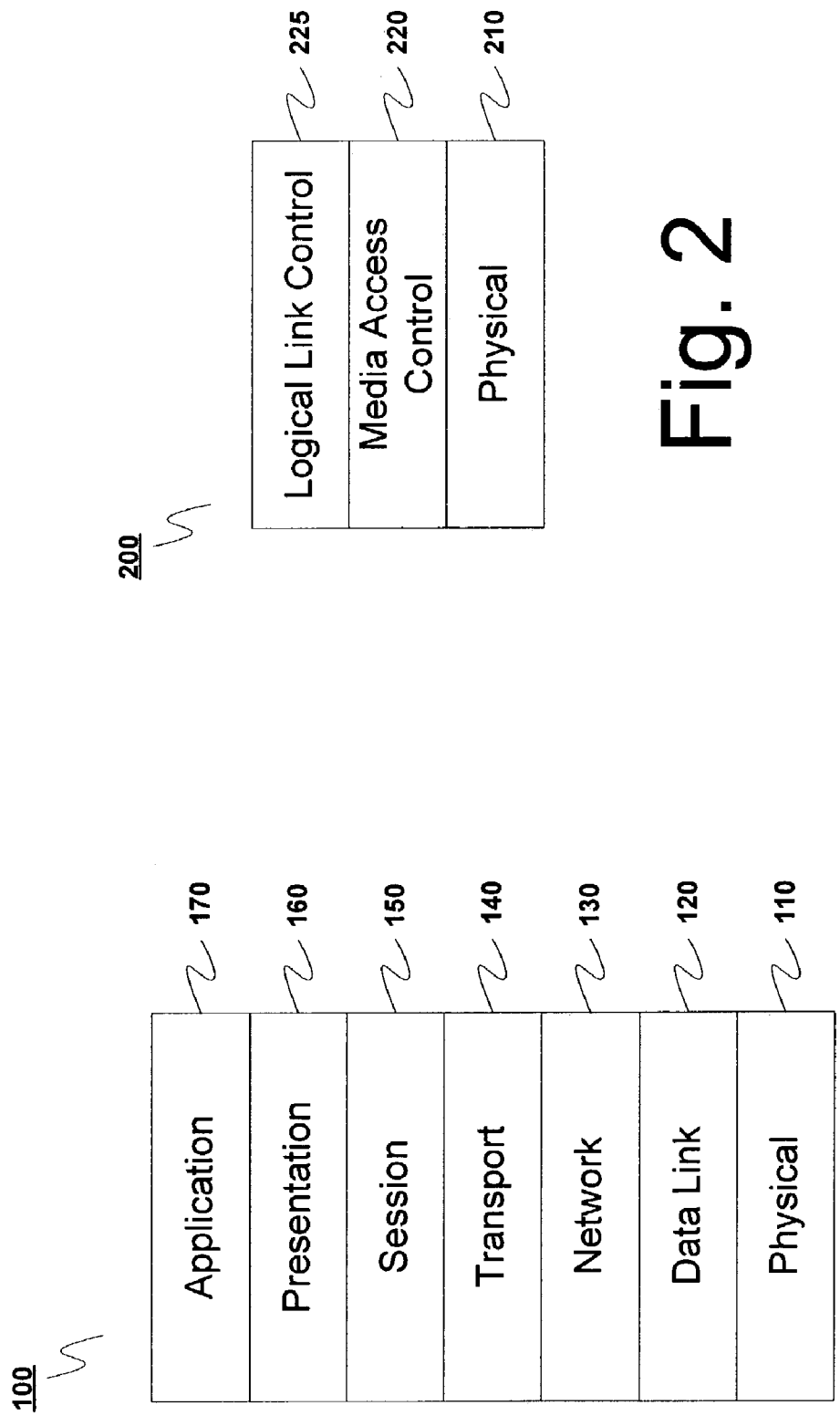

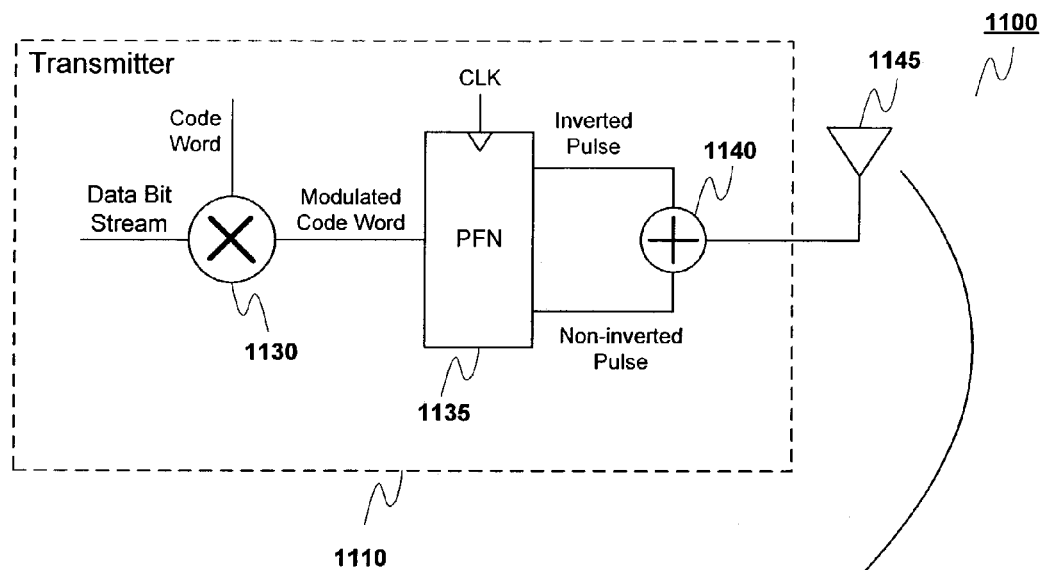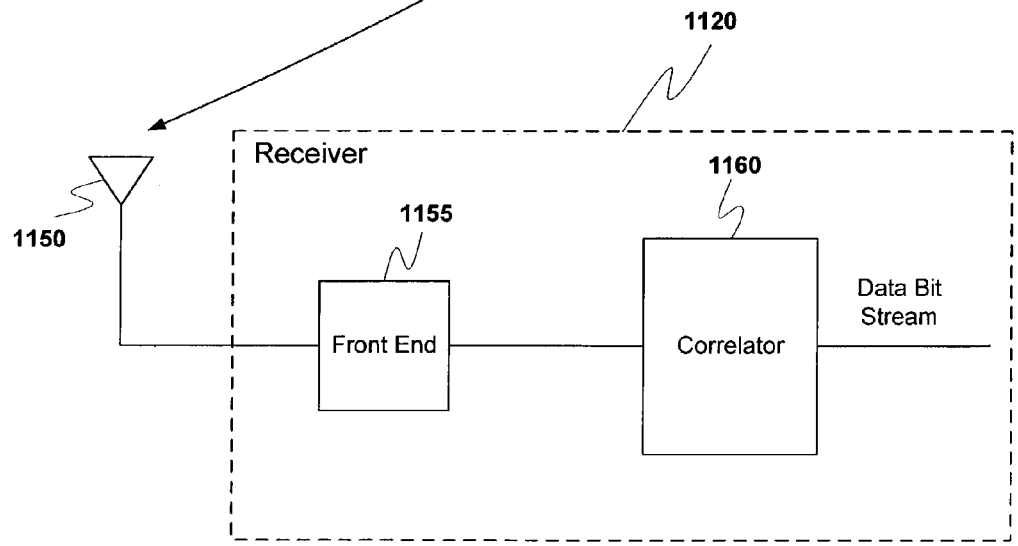
Fig. 11

METHOD OF ACCOMMODATING OVERLAPPING OR ADJACENT NETWORKS

CROSS-REFERENCE TO RELATED PATENT DOCUMENTS

This application relies for priority on U.S. provisional application Ser. No. 60/361,716, by Richard D. Roberts, filed Mar. 6, 2002, entitled "A MULTI-LAYER METHOD FOR ACCOMMODATING OVERLAPPING PICONETS," and U.S. provisional application Ser. No. 60/417,657, by Richard D. Roberts, filed Oct. 11, 2002, entitled "SELF-ORGANIZED MULTI-USER ACCESS METHOD FOR THE MULTI-PICONET ENVIRONMENT," the contents of both of which are hereby incorporated by reference in their entirety.

BACKGROUND OF THE INVENTION

The present invention relates to wireless personal area networks and wireless local area networks. More particularly, the present invention relates to how to accommodate overlapping wireless networks.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course of the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

One important aspect of wireless networks is how they deal with overlapping or adjacent networks. Given the potential mobility of many wireless networks, and the wireless nature of their signals, the problem of interference between networks is important and should be addressed.

SUMMARY OF THE INVENTION

Consistent with the title of this section, only a brief description of selected features of the present invention is now presented. A more complete description of the present invention is the subject of this entire document.

An object of the present invention is to alleviate the problem of interference between adjacent or overlapping networks in a multiple step manner that looks first to the physical (PHY) layer, and then to successively higher layers if the problem cannot be solved at lower layers.

Another object of the present invention is to reduce interference problems in the simplest and least complicated manner possible.

These and other objects are accomplished by way of a method of limiting interference in a local wireless network. This method comprises: transmitting a first wireless signal within the local wireless network using a first set of transmission parameters; performing a first signal analysis to determine whether the signal quality of the first wireless signal is above a quality threshold; adjusting the first set of transmission parameters in the local wireless network to a second set of transmission parameters if the signal quality is below the quality threshold; transmitting a second wireless signal within the local wireless network using the first set of transmission parameters if the signal quality is determined to be above the quality threshold in the step of performing a first signal analysis; and transmitting a second wireless signal within the local wireless network using the second set of transmission parameters if the signal quality is determined to be below the quality threshold in the step of performing a first signal analysis.

The first transmission parameters preferably include a first transmission phase and a first set of code words used to encode data; and the second transmission parameters preferably include a second transmission phase and a second set of code words used to encode data.

In one case, the second transmission phase may be different from the first transmission phase and the second set of code words may be the same as the first set of code words. In another case, the second transmission phase may be the same as the first transmission phase and the second set of code words may be different from the first set of code words. In yet another case, the second transmission phase may be different from the first transmission phase and the second set of code words may be different from the first set of code words.

If there is a difference between the second transmission phase and the first transmission phase, it is preferably determined in a random manner.

The first set of code words preferably has cross correlation parameters such that correlation between any two of the first set of code words produces a first correlation value greater than an expected correlation value between two random code words. If the second set of code words differs from the first set of code words, the second set of code words preferably has second cross correlation parameters such that correlation between any two of the second set of code words produces a second correlation value greater than the expected correlation value between two random code words.

The method of limiting interference in a local wireless network may further comprise: performing a second signal analysis to determine whether the signal quality of the second wireless signal is above the quality threshold; detecting whether a remote wireless network is in proximity with the local wireless network if the signal quality is below the quality threshold; determining whether a merger of the local wireless network and the remote wireless network is acceptable, if the remote wireless network is detected; and merging the local wireless network with the interfering wireless network if the determining step shows that the merger is acceptable.

The method of limiting interference in a local wireless network may further comprise performing an error handling procedure if either detecting step does not detect the remote wireless network or the determining step shows that the merger is not acceptable.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a diagram showing the hierarchy of the seven-layered OSI standard;

FIG. 2 is a diagram showing the IEEE 802 standard;

FIG. 11 is a block diagram of a transmitter and receiver pair according to a preferred embodiment of the present invention;

DETAILED DESCRIPTION OF THE PREFERRED EMBODIMENTS

Figure 3:
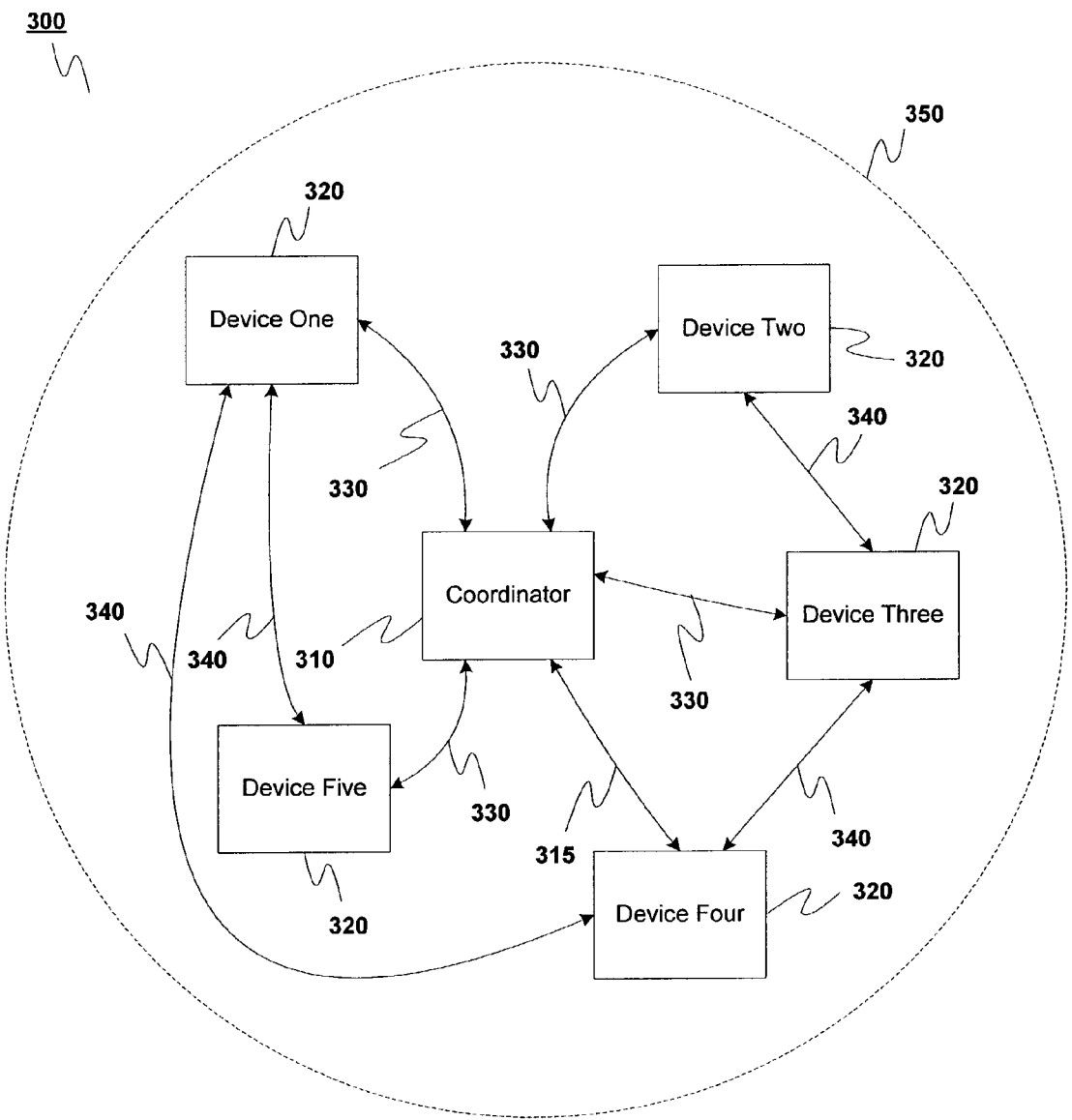
FIG. 3 is a block diagram of a wireless network according to a preferred embodiment of the present invention.
Figure 4:
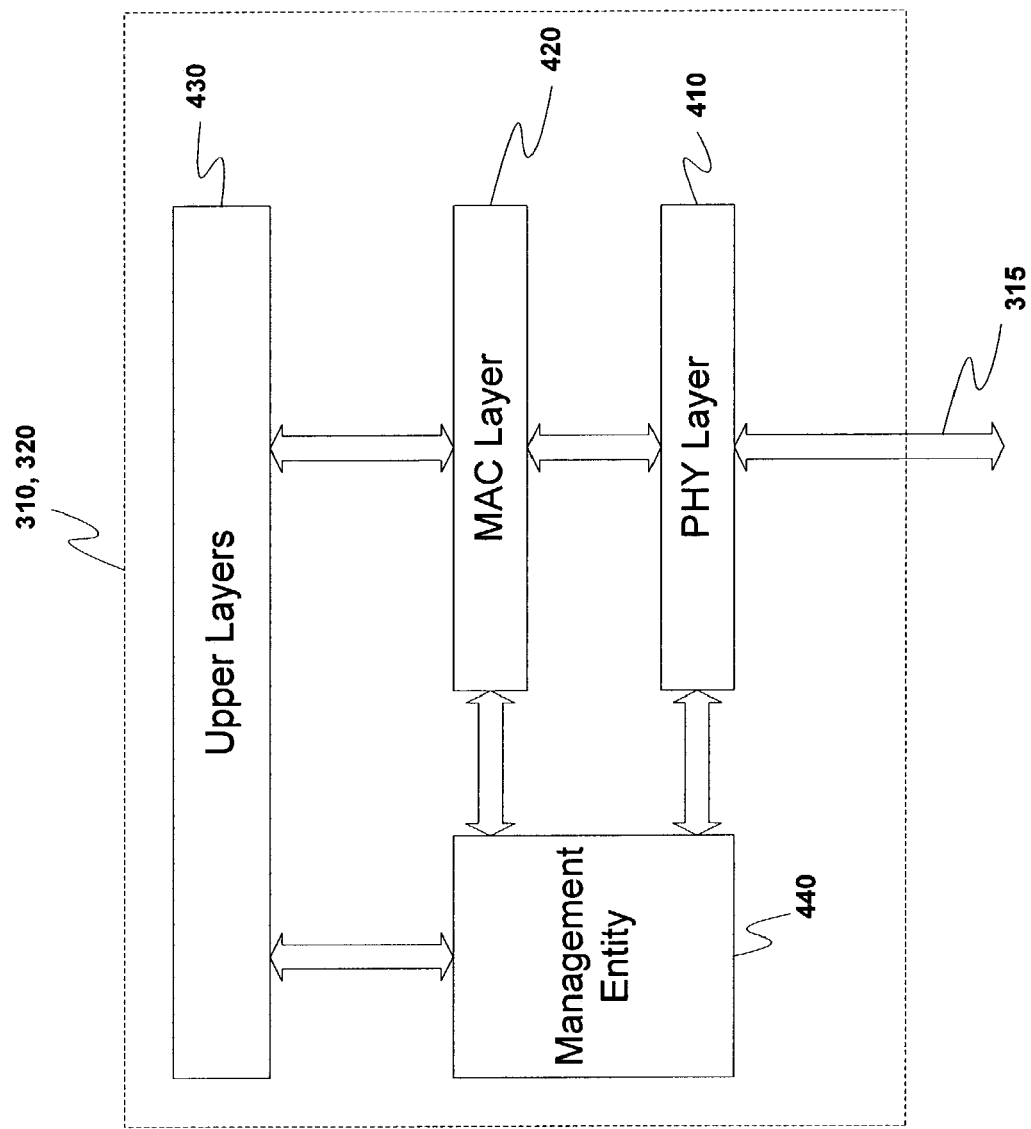
FIG. 4 is a block diagram of a device from the network of FIG. 3.

Preferred embodiments of the present invention will now be described with reference to the drawings. Throughout the several views, like reference numerals designate identical or corresponding parts.

Superframes

The available bandwidth in a given network 300 is preferably split up in time by the coordinator 310 into a series of repeated superframes. These superframes define how the available transmission time is split up among various tasks. Individual frames of data are then transferred within these superframes in accordance with the timing set forth in the superframe.

Figure 5:
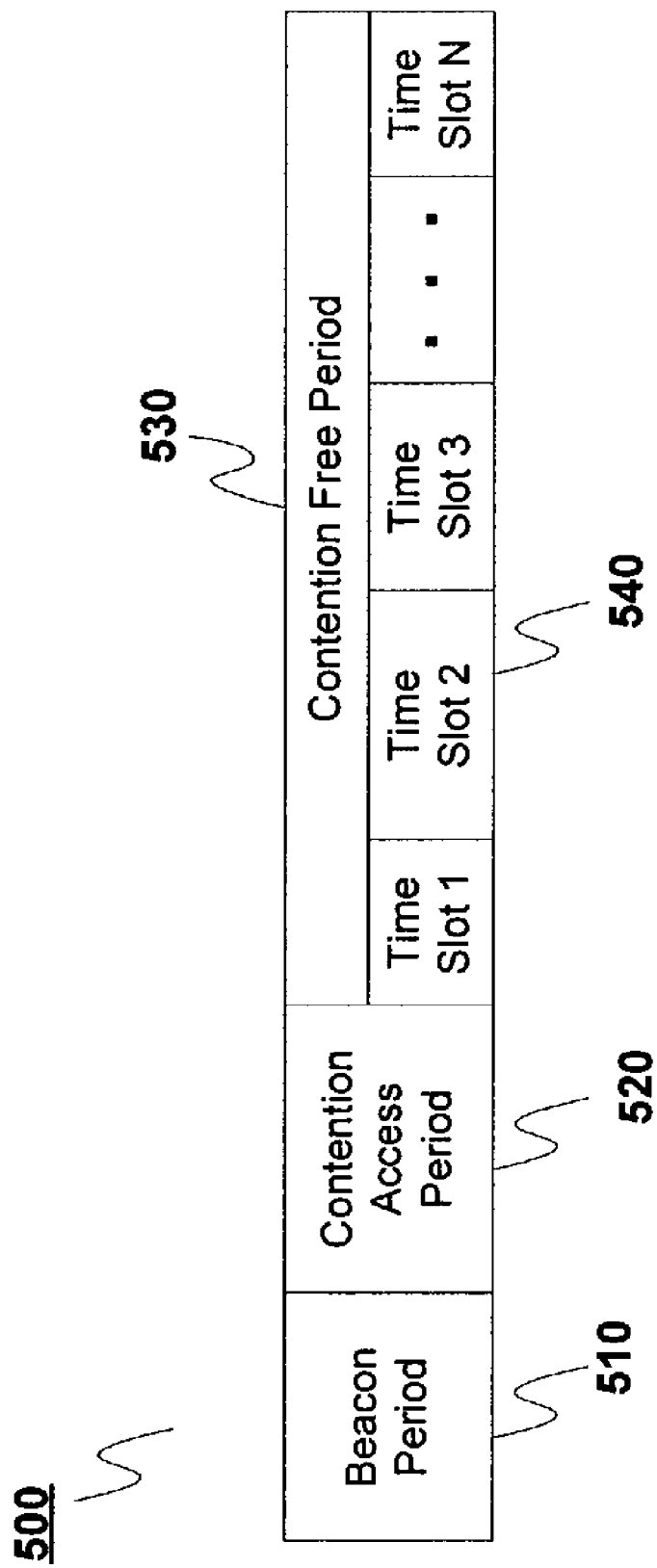
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot 540 that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot 540 that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, and MTS.

Figure 6:
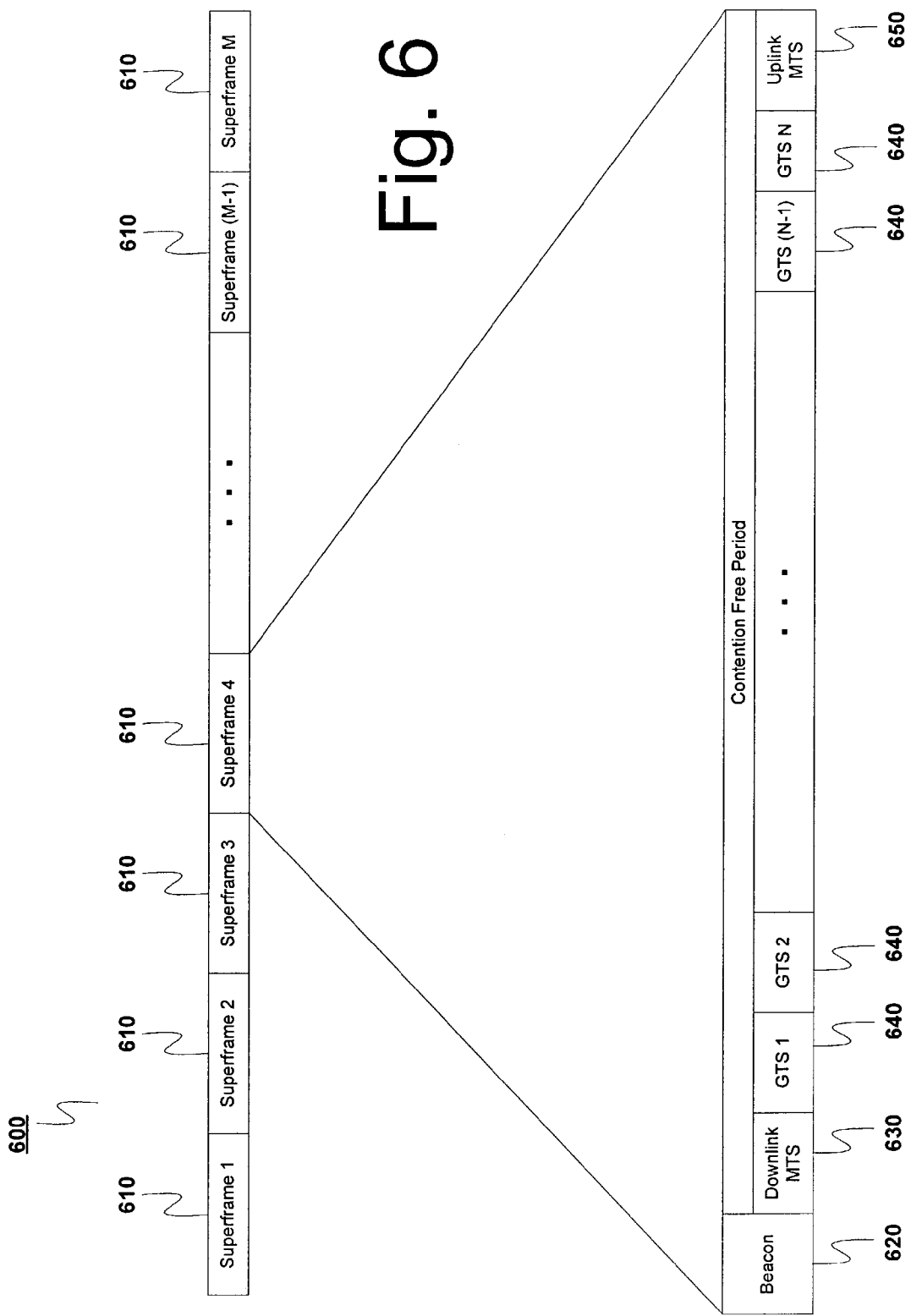
FIG. 6 is a block diagram of a specific superframe design according to a preferred embodiment of the present invention.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 650. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 650 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 650 must be chosen to handle the largest possible management frame, an immediate acknowledgement (ACK) frame, and the receiver-transmitter turnaround time. The GTS 640, the length and number must be chosen to accommodate the specific requirements of frames to be transmitted, e.g., short MPEG frames, large frames of the maximum allowable length, and the ACK policy used.

Although the disclosed embodiment uses one uplink MTS 630 placed before a plurality of GTS 640, and one downlink MTS 650 placed after a plurality of GTS 640, the number, distribution, and placement of MTS 630, 650 and GTS 640 may be varied in alternate embodiments.

Information Packets

Figure 7A:
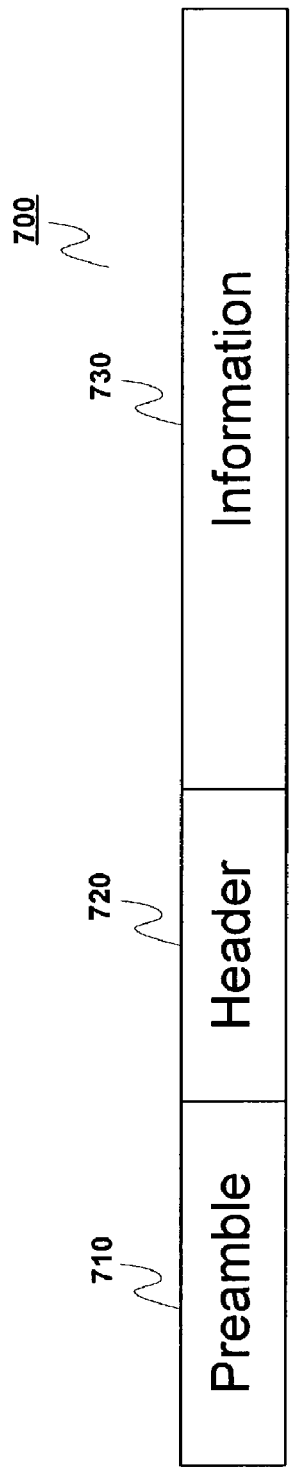
FIG. 7A is a block diagram of a data packet according to a preferred embodiment of the present invention.

The information sent in the beacon 510, contention access period 520, and the various time slots 540 in the contention free period 530 are preferably sent as packets. FIG. 7A is a block diagram of a packet according to a preferred embodiment of the present invention.

As shown in FIG. 7A, each packet 700 includes a preamble 710, a header 720, and information 730. Each portion of the packet 700 is preferably made up of a series of pulses representing the bits of information in that portion of the packet 700.

In the preamble 710, the transmitting device sends a known sequence of signals. The receiving device listens for this known sequence in order to properly lock onto the signal from the transmitting device. Preferably no substantive information is sent in the preamble 710 since the receiving device is still getting its timing synchronized with that of the transmitting device.

The header 720 includes information about the intended recipient of the packet 700 and other identifying information.

The information 730 includes the substantive information being transmitted by the packet 700. For example, a beacon packet includes beacon information that regulates the operation of a superframe 500, 610, while a data packet includes data that is being transferred from a transmitting device to a receiving device.

Figure 7B:
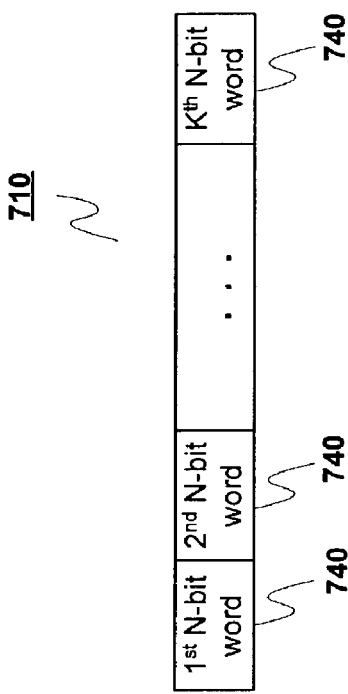
FIG. 7B is a block diagram of the preamble of the data packet of FIG. 7A, according to a preferred embodiment of the present invention.

FIG. 7B is a block diagram showing an exemplary preamble. As shown in FIG. 7B, the exemplary preamble 710 includes an N-bit word repeated K times, where K and N are both integers greater than 0. In some embodiments this N-bit word can be a code word associated with the network 300. (See FIGS. 9 and 10)

Composition of Packets

In one embodiment of a UWB system, the actual information packets are comprised of trains of short duration pulses (also called wavelets) formed using a single basic pulse shape. The interval between individual pulses can be uniform or variable, and there are a number of different methods that can be used for modulating the pulse train with data for communications.

Another important point common to UWB systems is that the individual pulses are very short in duration, typically much shorter than the interval corresponding to a single bit, which can offer advantages in resolving multipath components. A general UWB pulse train signal can be represented as a sum of pulses shifted in time, as shown in Equation (1):

$$s(t) = \sum_{k=-\infty}^{\infty} a_k p(t - t_k) \quad (1)$$

Figure 8:
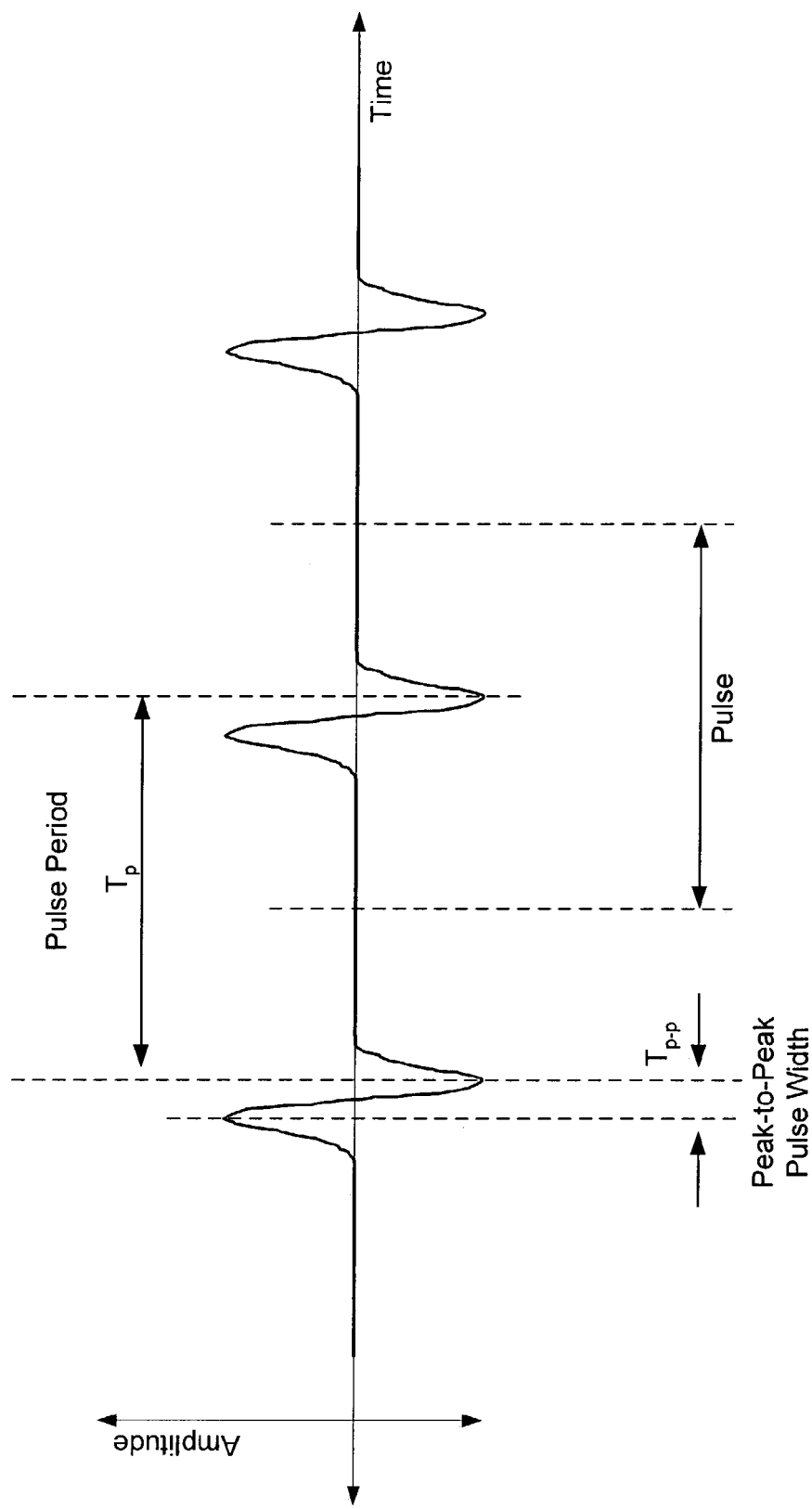
FIG. 8 is a graph of a typical pulse stream according to a preferred embodiment of the present invention.

Here s(t) is the UWB signal, p(t) is the basic pulse shape, and $a_k$ and $t_k$ are the amplitude and time offset for each individual pulse. Because of the short duration of the pulses, the spectrum of the UWB signal can be several gigahertz or more in bandwidth. An example of a typical pulse stream is shown in FIG. 8. Here the pulse is a Gaussian mono-pulse with a peak-to-peak time ($T_{p-p}$) of a fraction of a nanosecond, a pulse period $T_p$ of several nanoseconds, and a bandwidth of several gigahertz.

Code Word

An alternative to sending data as individual pulses is to instead represent each bit by a series of pulses (i.e., +1 and −1 values). This series of pulses can be called a code word. In a binary system, a set of BPSK pulses will preferably be chosen to represent a "0" and its inverse will preferably be chosen to represent a "1."

Figure 9:
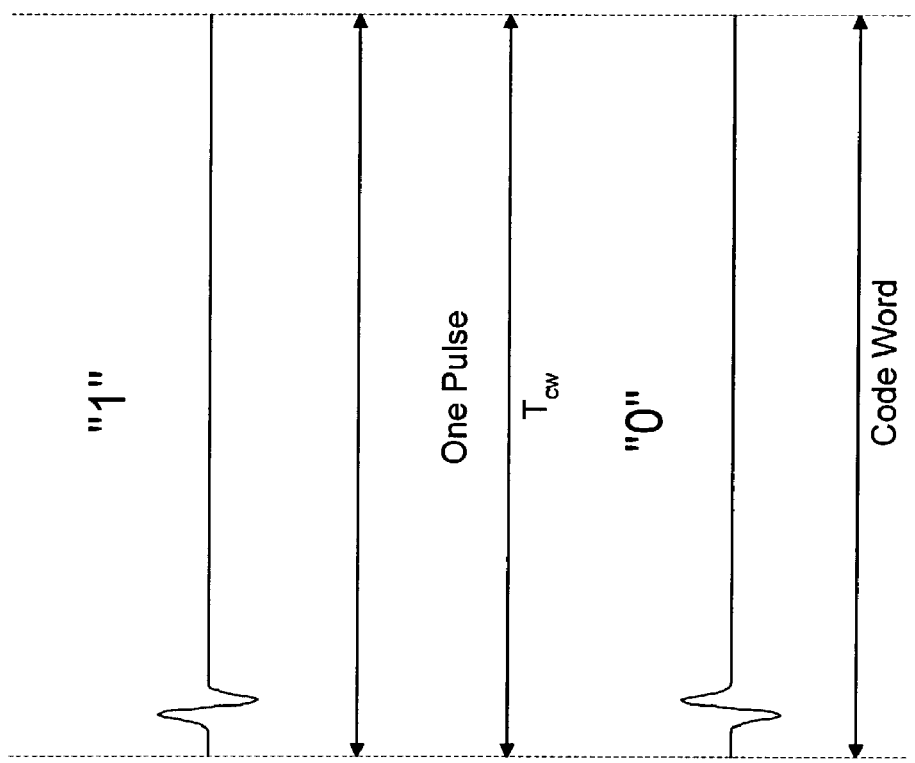
FIG. 9 is a timing diagram showing a one-pulse code word according to a preferred embodiment of the present invention.
Figure 10:
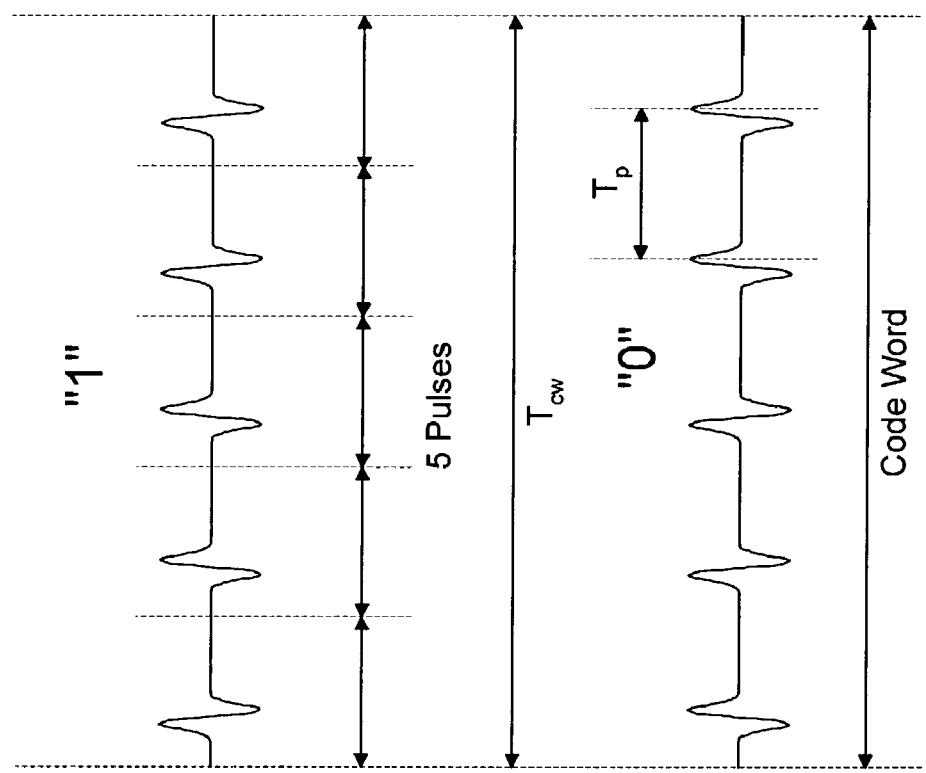
FIG. 10 is a timing diagram showing a five-pulse code word according to a preferred embodiment of the present invention.

Individual pulses are then ordered together into code words to transfer data at a given data rate, with each code word corresponding to one or more bits of information to be transferred. The code words have a code word period $T_{cw}$, indicating the duration of an code word, and a related code word frequency $F_{cw}$. This may correspond to the data rate, though it does not have to. FIGS. 9 and 10 show two examples of code words.

FIG. 9 is a timing diagram showing a one-pulse code word according to a preferred embodiment of the present invention. This simple example has a code word that includes a single pulse. In this case the code word period $T_{cw}$ and the pulse period $T_p$ are the same (i.e., the pulses and the code words are transmitted at the same frequency). As shown in FIG. 9, the non-inverted pulse corresponds to a "1," and the inverted pulse corresponds to a "0." This could be reversed for alternate embodiments.

FIG. 10 is a timing diagram showing a five-pulse code word according to a preferred embodiment of the present invention. This embodiment has a code word that includes five pulses. In this case the code word period $T_{cw}$ is five times the pulse period $T_p$ (i.e., the code words are transmitted at one-fifth the frequency of the pulses).

In other words:

$$T_{cw} = N * T_p \quad (15)$$

for an N-pulse code word. Thus, the pulse period $T_p$ and number of pulses N per code word determine the period of the code word $T_{cw}$.

As shown in FIG. 10, a particular orientation of the five pulses corresponds to a "1", and the inverse of this orientation corresponds to a "0." The particular choice of pulse orientation and arrangement of pulses within the code word can be varied as necessary in alternate embodiments. What is important is that the "1" and "0" code words are the inverse of each other.

One preferred embodiment includes 13 analog pulses per code word, and sets the pulse frequency $F_p$ at 1.3 GHz (770 ps pulse period $T_p$). This results in a code word frequency $F_{cw}$ of 100 MHz (10 ns code word period $T_{cw}$), which corresponds to a data transfer rate of 100 Mbits of information per second.

The various parameters of peak-to-peak pulse width $T_{p-p}$, pulse period $T_p$, pulse frequency $F_p$, number of pulses per code word n, code word period $T_{cw}$, and code word frequency $F_{cw}$ can be varied as necessary to achieve the desired performance characteristics for the transceiver. For example, the embodiments disclosed in FIGS. 9 and 10 have the same code word period $T_{cw}$, despite the differing number of pulses n. This means that the transmission power for a given code word period $T_{cw}$ is used in a single pulse in the embodiment of FIG. 9, but is spread out over five pulses in the embodiment of FIG. 10. Alternate embodiments can obviously change these parameters as needed.

Thus, in the embodiment of FIG. 9, when a transmitter passes a bit of data to a receiver, the transmitter sends the bit as a code word (i.e., a set arrangement of one or more pulses). As noted above, the bits are preferably represented by inverse code words such that the non-inverted code word represents a "1" and the inverted code word represents a "1." However, in alternate embodiments this assignment of code word/inverse code word to "1" and "0" values can be reversed.

In addition, Although FIG. 10 shows a code word having five pulses, this number can be varied as needed. Alternate embodiments can use any code word length that allows system requirements to be met. For example, as clock speeds increase, the number of pulses that can be sent in a given time will increase and longer code word lengths may be used.

This approach can use sparse wavelet codes, CDMA codes, or any other sort of coding approach that is desired and can fulfill the requirements set forth below.

In alternate embodiments a ternary system of pulses can be used. In this case the pulses can have three values (generally +1, 0, and −1). A non-inverted pulse generally represents a +1, the absence of a pulse represents a 0, and an inverted pulse represents a −1. In this embodiment a series of ternary values (non-inverted pulse, inverted pulse, or absence of pulse) are formed together to make a code word.

Transmission of Code Words

FIG. 11 is a block diagram of a transmitter and receiver pair according to a preferred embodiment of the present invention. As shown in FIG. 11, the transmitter receiver pair includes a transmitter 1110 and a receiver 1120. The transmitter 1110 includes a mixer 1130, a pulse-forming network (PFN) 1135, an adder 1140, and a transmitting antenna 1145. The receiver 1120 includes a receiving antenna 1150, a front end 1155, and a correlator 1160.

Transmitter

The mixer 1130 receives an information bit stream and a code word, and modulates the information bit stream with the code word. The information bit stream arrives at a data frequency, and the code word arrives at a pulse frequency that is preferably equal to the data frequency times the number of pulses per code word. The mixer 1130 then outputs (at the pulse frequency) a series of "1"s and "0"s corresponding to the modulated code word (e.g., the non-inverted code word for an information bit of "1" and an inverted code word for an information bit of "0").

The PFN 1135 receives the string of "1"s and "0"s that define the modulated code word and outputs either a non-inverted or an inverted pulse in response to each bit of the modulated code word. In the preferred embodiment, the PFN 1135 receives a clock signal CLK (running at the pulse frequency) and the modulated code word as inputs, and has non-inverted and inverted outputs. Whenever the clock CLK cycles, the PFN 1135 outputs either a non-inverted pulse at the non-inverted output, or an inverted pulse at the inverted output, depending upon the value of the individual bits in the code word.

The adder 1140 then adds together the inverting and non-inverting outputs (only one of which should be active at a time) to provide a single output pulse. This output pulse will be either a positive (non-inverting) pulse or a negative (inverted) pulse, depending upon the value of the current bit of the code word when the clock CLK cycles. Alternate embodiments of the PFN 1135 could have a single output that outputs either an inverted or non-inverted pulse depending upon the value of the current bit of the code word. In such embodiments there is no need for the adder 1140.

The output of the adder 1140 is then sent to the transmitting antenna 1145, which transmits the pulses to the receiver 1120.

Receiver

The receiving antenna 1150 receives the pulses in a signal sent by the transmitting antenna 1145 in the transmitter 1110.

The front end 1155 preferably performs necessary operations on the received signal to better allow the remainder of the receiver 1120 to properly process it. This can include performing filtering and amplifying the signal.

The correlator 1160 receives a modulated code word from the front end 1155, determines what received bit corresponds to that code word (or inverse code word) and outputs the corresponding bit. In alternate embodiments the correlator 1160 may have multiple branches (called arms or fingers) to look for multiple code words.

Operation of the Correlator

Figure 12:
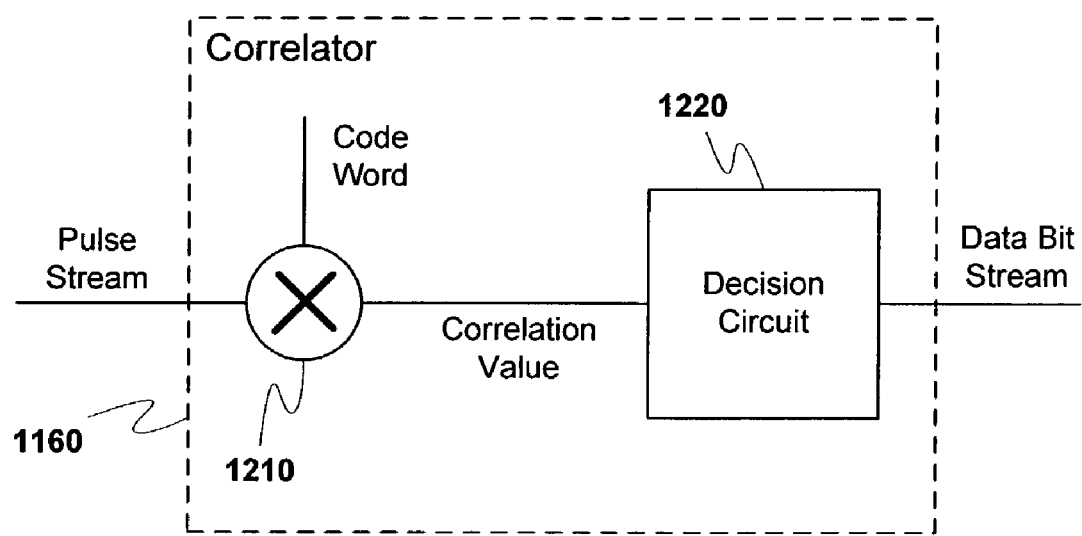
FIG. 12 is a block diagram of the correlator of FIG. 11 according to a preferred embodiment of the present invention.

In one implementation, the correlator 1160 operates to compare the incoming signal with a given code word to determine whether a logical "1" or "0" has been received. FIG. 12 is a block diagram of the correlator of FIG. 11 according to a preferred embodiment of the present invention. As shown in FIG. 12, the correlator 1160 includes a mixer 1210 and a decision circuit 1220.

The mixer 1210 receives the incoming signal and a code word at the pulse frequency, mixes the code word CW with a portion of the incoming signal equal in length to the code word, and outputs a correlation result. This correlation result will be a large positive number if the code word is matched or a large negative number if the inverse of the code word is matched. By examining the correlation result, the decision circuit 1020 determines what data bit the code word corresponds to (i.e., a "1" or a "0"), and outputs that data bit to other circuitry in the receiver 1120. The correlation result also allows the decision circuit 1220 to determine if the received series of pulses does not correspond to either a code word or inverse code word and is therefore a failed transmission.

Correlation

The correlation value is determined by multiplying each of the received N pulses with corresponding portions of an N-pulse (i.e., N-bit) code word, and adding the results together. Thus, the first received pulse will be multiplied with the first portion of the code word, the second received pulse will be multiplied with the second portion of the code word, and so on until the Nth received pulse will be multiplied with the Nth portion of the code word. These products will then be summed to get a final correlation value.

Consider the example of a 13-bit word where 0010101001011 corresponds to a logical "1" and 1101010110100 corresponds to a logical "0." In this case, the code word supplied to the mixer 1210 will be a series of non-inverted and inverted pulses, the non-inverted pulses corresponding to the logical "1" values and the inverted pulses corresponding to the logical "0" values. Thus, the code word supplied to the mixer 1210 will actually be (−1)(−1)(+1) (−1)(+1) (−1)(+1)(−1) (−1)(+1)(−1)(+1)(+1).

For any of the 13 pulses that make up a received word, the receiver 1120 could receive either a "1," a "0," or neither. Tables 1 through 3 show how the correlation of these incoming signals would take place. In Table 1, the received 13-pulse sequence is identical to the code word and results in a large positive correlation value (13 in this example).

TABLE 1

Logical "1" Received

| | | | | | | | | | | | | | | |
|---|---|---|---|---|---|---|---|---|---|---|---|---|---|---|
| Code Word | −1 | −1 | +1 | −1 | +1 | −1 | +1 | −1 | −1 | +1 | −1 | +1 | +1 | |
| Received Bits | −1 | −1 | +1 | −1 | +1 | −1 | +1 | −1 | −1 | +1 | −1 | +1 | +1 | |
| Correlation | 1 | 1 | 1 | 1 | 1 | 1 | 1 | 1 | 1 | 1 | 1 | 1 | 1 | 13 Total |

In Table 2 the received 13-pulse sequence is the inverse of the code word and results in a large negative correlation value (−13 in this example).

TABLE 2

Logical "0" Received

| Code Word | −1 | −1 | +1 | −1 | +1 | −1 | +1 | −1 | −1 | +1 | −1 | +1 | +1 | |
|---|---|---|---|---|---|---|---|---|---|---|---|---|---|---|
| Received Bits | +1 | +1 | −1 | +1 | −1 | +1 | −1 | +1 | +1 | −1 | +1 | −1 | −1 | |
| Correlation | −1 | −1 | −1 | −1 | −1 | −1 | −1 | −1 | −1 | −1 | −1 | −1 | −1 | −13 Total |

In Table 3 the received 13-pulse sequence is neither the code word nor inverse of the code word, but is another pulse (i.e., bit) sequence altogether. In this example the pulse sequence (−1) (+1) (−1) (+1) (+1) (−1) (+1) (−1) (−1) (+1) (+1) (−1) (+1) was chosen, which results in a low correlation value (3 in this example). Alternate pulse sequences would result in a value between the maximum negative and maximum positive correlation values (−13 and 13 in this example). However, signal strengths being equal, only a sequence corresponding to the code word will result in a maximum positive correlation value (13 in this example), and only a sequence corresponding to the inverse of the code word will result in a maximum negative correlation value (13 in this example). All other values will be in between these two.

TABLE 3

Random Sequence Received

| Code Word | −1 | −1 | +1 | −1 | +1 | −1 | +1 | −1 | −1 | +1 | −1 | +1 | +1 | |
|---|---|---|---|---|---|---|---|---|---|---|---|---|---|---|
| Received Bits | −1 | +1 | −1 | +1 | +1 | −1 | +1 | −1 | −1 | +1 | +1 | −1 | +1 | |
| Correlation | 1 | −1 | −1 | −1 | 1 | 1 | 1 | 1 | 1 | 1 | −1 | −1 | 1 | 3 Total |

Although the values for the received pulses in Tables 1 to 3 are shown as +1 or −1, given noise, distance, and other random effects, the values of the received pulses (which correspond to the amplitude of the received pulses) will not be exactly 1 or −1. Therefore it is preferable for the decision circuit 1220 to set positive and negative correlation thresholds for determining logical "1" and "0" results. If the correlation value is above the positive correlation threshold, the decision circuit 1220 determines that a logical "1" was received; if the correlation value is below the negative correlation threshold, the decision circuit 1220 determines that a logical "0" was received.

In a hard decision forward error correction (FEC) implementation, a single threshold is used so that an incoming code word must be interpreted as either a "1" (above the threshold) or a "0" (below the threshold). In a soft decision FEC implementation, the thresholds can be different. In this case, if the correlation value is between the negative correlation threshold and the positive correlation threshold, the decision circuit 1220 determines that no valid data was received.

In a hard decision FEC implementation the single correlation threshold is preferably set to zero. In a soft decision FEC implementation the positive and negative correlation thresholds can be chosen as needed to achieve desired system, performance.

Furthermore, to increase transmission range, the power levels of the transmitted pulses may be significantly higher than the power levels of the code word supplied to the mixer 1220. Thus, at very close ranges (where the signal strength has not had time to drop off significantly), the correlation values may be much higher than the length of the code word. For example, the transmitted pulses might have five times the power level of the code word supplied to the mixer 1220. At short range, where the transmitted pulses have only had a chance to drop off to a power level of four times the power level of the code word supplied to the mixer 1220, the correlation result for a "1" could be as high as 52 for the examples given above. However, this would affect both positive and negative values, so a successful correlation should still be a high negative number or a high positive number. Thus, it should still be easy to differentiate between a "1" and a "0." This is particularly true with hard decision FEC, where the single correlation threshold is zero.

Although a 13-bit code word is used with respect to the examples of Tables 1 to 3, alternate sized code words can be used, with correlation thresholds modified accordingly.

The Multiple Network Problem

FIG. 3 shows a single network 300. However, often more than one network will occupy a given area. This means that multiple different networks can be either adjacent to each other or overlapping each other.

Figure 13:
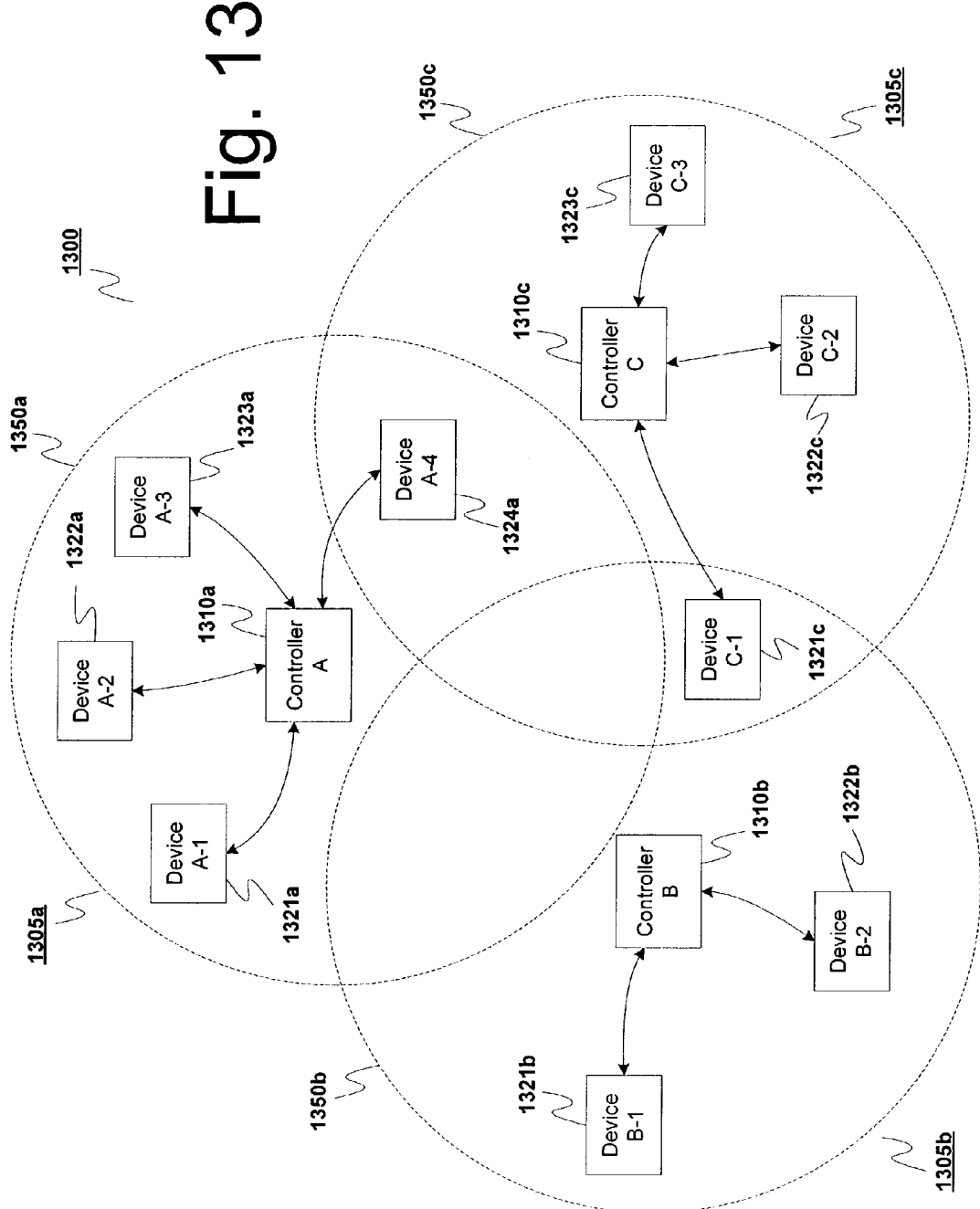
FIG. 13 is a block diagram of a multiple network environment according to a preferred embodiment of the present invention.

FIG. 13 is a block diagram of a multiple network environment according to a preferred embodiment of the present invention. The multiple network environment 1300 includes three separate overlapping networks: a first network 1305*a*, a second network 1305*b*, and a third network 1305*c*. In basic function, elements in these networks 1305*a*, 1305*b*, 1305*c* behave as corresponding elements shown in FIG. 3. The networks 1305*a*, 1305*b*, 1305*c* may be piconets or other wireless networks, as described above with respect to FIG. 3. Although all three networks in FIG. 13 are shown as overlapping, in alternate embodiments they could increase or decrease the number of networks and can have them adjacent or overlapping.

As shown in FIG. 13, the first network 1305*a* includes a coordinator 1310*a*, and a plurality of devices 1321*a*-1324*a*; the second network 1305*b* includes a coordinator 1310*a*, and a plurality of devices 1321*b*-1322*b*; and the third network 1305*c* includes a coordinator 1310*c*, and a plurality of devices 1321*c*-1323*c*. Each device 1321*a*-1324*a*, 1321*b*-1322*b*, 1321*c*-1323*c* is connected to its respective coordinator 1310*a*, 1310*b*, 1310*c* via a primary wireless link 1330. In addition, although not shown, each device 1321*a*-1324*a*, 1321*b*-1322*b*, 1321*c*-1323*c* may also be connected to one or more other devices 1321a-1324a, 1321b-1322b, 1321c-1323c within its network 1305a, 1305b, 1305c via secondary wireless links, as described above with respect to FIG. 3.

The various devices 1321a-1324a, 1321b-1322b, 1321c-1323c of a given network are confined to a usable physical area 1350a, 1350b, 1350c, which is set based on the extent to which the coordinator 1310a, 1310b, 1310c can successfully communicate with each of the devices 1321a-1324a, 1321b-1322b, 1321c-1323c. Any device 1321a-1324a, 1321b-1322b, 1321c-1323c that is able to communicate with a given coordinator 1310a, 1310b, 1310c (and vice versa) is within the usable area 1350a, 1350b, 1350c of the network 1305a, 1305b, 1305c. As noted, however, it is not necessary for every device 1321a-1324a, 1321b-1322b, 1321c-1323c in a given network 1305a, 1305b, 1305c to communicate with every other device 1321a-1324a, 1321b-1322b, 1321c-1323c in that network.

Although three overlapping networks 1305a, 1305b, and 1305c are shown in FIG. 13, alternate embodiments can include fewer or more networks, being overlapping or adjacent. While the embodiment of FIG. 13 shows all of the networks 1305a, 1305b, and 1305c overlapping in usable area 1350a, 1350b, 1350c, this need not be the case if interference is possible between elements of the networks 1305a, 1305b, 1305c.

In addition, although the first network 1350a is shown as having four devices 1321a-1324a, the second network 1350b is shown as having two devices 1321b-1322b, and the third network 1350c is shown as having three devices 1321c-1323c, alternate embodiments can vary the number of devices in each network.

In the multiple network environment 1300 described above with reference to FIG. 13, some of devices 1321a-1324a, 1321b-1322b, 1321c-1323c will be close enough to other devices 1321a-1324a, 1321b-1322b, 1321c-1323c, such that interference will be possible between those devices.

As noted above, the coordinator 1310a, 1310b, 1310c of a network 1305a, 1305b, 1305c may be the same sort of device as any of the devices 1321a-1324a, 1321b-1322b, 1321c-1323c, except with the additional functionality for controlling the system and the requirement that it communicate with every device 1321a-1324a, 1321b-1322b, 1321c-1323c in the network 1305a, 1305b, 1305c.

Part of the problem experienced by a UWB wireless network is that more than one device (coordinators 1310a, 1310b, 1310c and devices 1321a-1324a, 1321b-1322b, 1321c-1323c) may have to communicate in the same frequency band. In some embodiments the system may not have the advantage of frequency division multiplexing. But even with embodiments that use frequency division multiplexing, there still may be more networks in an area than there are available frequency bands to use. In either case, two or more networks may be forced to use the same frequency band and may interfere.

Therefore, it is necessary to get multiple networks to use the same ultrawide bandwidth frequency band at the same time without causing interference between the networks.

One way to solve the problem of overlapping networks is to work at the PHY layer 410 in each device. For example, you could encode the pulses transmitted by the various networks 1305a, 1305b, 1305c such that each network 1305a, 1305b, 1305c uses a different transmission code. For example, the first network 1305a would use a first code, the second network 1305b would use a second code, and the third network 1305c would use a third code.

However, using separate codes imposes a performance cost on the networks. For example, there are only so many code words that have acceptable parameters for use in a UWB system. If a given implementation requires too many code words, it may be impossible to find enough with the desired properties.

An alternative is to use a multiple-layer approach for solving the problems associated with overlapping networks. This allows the network to solve the problem across the multiple layers, without forcing it to try and solve the problems in any one particular layer.

This allows the networks to solve the overlap problems partly in the PHY layer 410, partly in the MAC layer 420, and partly in the management entity layer 440. It is possible to examine each layer and determine how they can cooperate with each other to allow overlapping networks to function Physical Layer First, consider the PHY layer 410. Each PHY layer 410 in each device has to generate the same physical sort of waveform—each has to send a series of pulses of a particular type. (See, e.g., FIG. 8) However, each network must encode these pulses such that their code does not correlate well with the codes from any other network that might overlap or become adjacent.

Each PHY layer 410 in a network uses the same code (i.e., code word) and each separate network uses a different code that preferably does not correlate well with the codes used by other networks.

The code is preferably selected very carefully, and is assigned to a given channel (i.e., a network operating at a given frequency). When a device first comes on the air to form a network, it must scan all known channels/codes and select a channel and corresponding code that is not in use, and that has a minimal interference with existing codes. Preferably, each code word set will have a unique chip frequency assigned to it.

However, this solution alone cannot provide for guaranteed performance among multiple overlapping or adjacent networks. First, when a network is formed, there is no guarantee that the network can find an acceptable code to use for that channel. It may be that when the network is started, there are no available codes that are acceptable.

In addition, the PHY layer 410 may suffer near-far interference, which may obscure the desired signal regardless of the codes chosen. Near-far interference refers to the situation where a close interfering device will obscure a received signal, even though its code does not correlate well with the code of the other network.

Thus, while it is possible for the PHY layer 410 to accommodate or adjacent overlapping networks on its own to some degree, this solution is by no means a complete one. Thus it is therefore necessary to provide for the alternative when a solution based on action by the PHY layer 410 is not sufficient. In preferred embodiments of the present invention, if the PHY layer 410 fails to accommodate overlapping networks, then the device suffering interference will turn to a higher layer for a solution.

Media Access Control Layer

The MAC layer 420 is located above the PHY layer 410, and serves as a second possibility for regulating overlapping or adjacent networks. It can attempt to eliminate these problems by doing something that changes the cross correlation characteristics of the transmitted signal and the interfering signal. This could include changing the changing the transmission phase or changing the code word used.

As shown in FIGS. 5 and 6, a majority of information sent between devices will be sent during time slots 540. Only beacon packets (which are sent only by a coordinator) and any packets sent during a contention access period 520 (which may not even exist in some embodiments) will not be sent during time slots 540. And regardless, as noted above with respect to FIG. 7A, no matter when it is sent, all information is transmitted via packets 700.

As noted above, the preamble 710 in each packet 700 includes a repetitive pattern (e.g., the repeated N-bit word in FIG. 7B) used for phase synchronization. Preferably the repetitive pattern identifies a particular network that it belongs to, e.g., it uses the code word assigned to that network as the repeated N-bit word. One way of doing this would be to have each network use a different repeated N-bit word.

In this case, a correlator 1160 in the PHY layer 410 of the receiving device can provide an efficient acquisition method, i.e., a way of identifying the repetitive pattern. The correlator 1160 can compare the repeated N-bit word with the code word assigned to the network the device is in to see if the received packet belongs in the current device's network. In correlators 1160 with multiple arms, the correlator 1160 may be able to determine which of a plurality of networks the packet belongs to by comparing the repeated N-bit word with multiple code words.

Near-Far Problem

However, the near-far problem can interfere with this auto-correlation process. As described above, the near-far problem occurs when an interfering transmitter is so close to a receiver that the desired signal is overwhelmed by the interference. An originating station can suspect that a near-far problem has occurred when it does not get an acknowledgement (ACK) in response to a sent packet, and can then take steps to reduce or eliminate the near-far problem.

Figure 14:
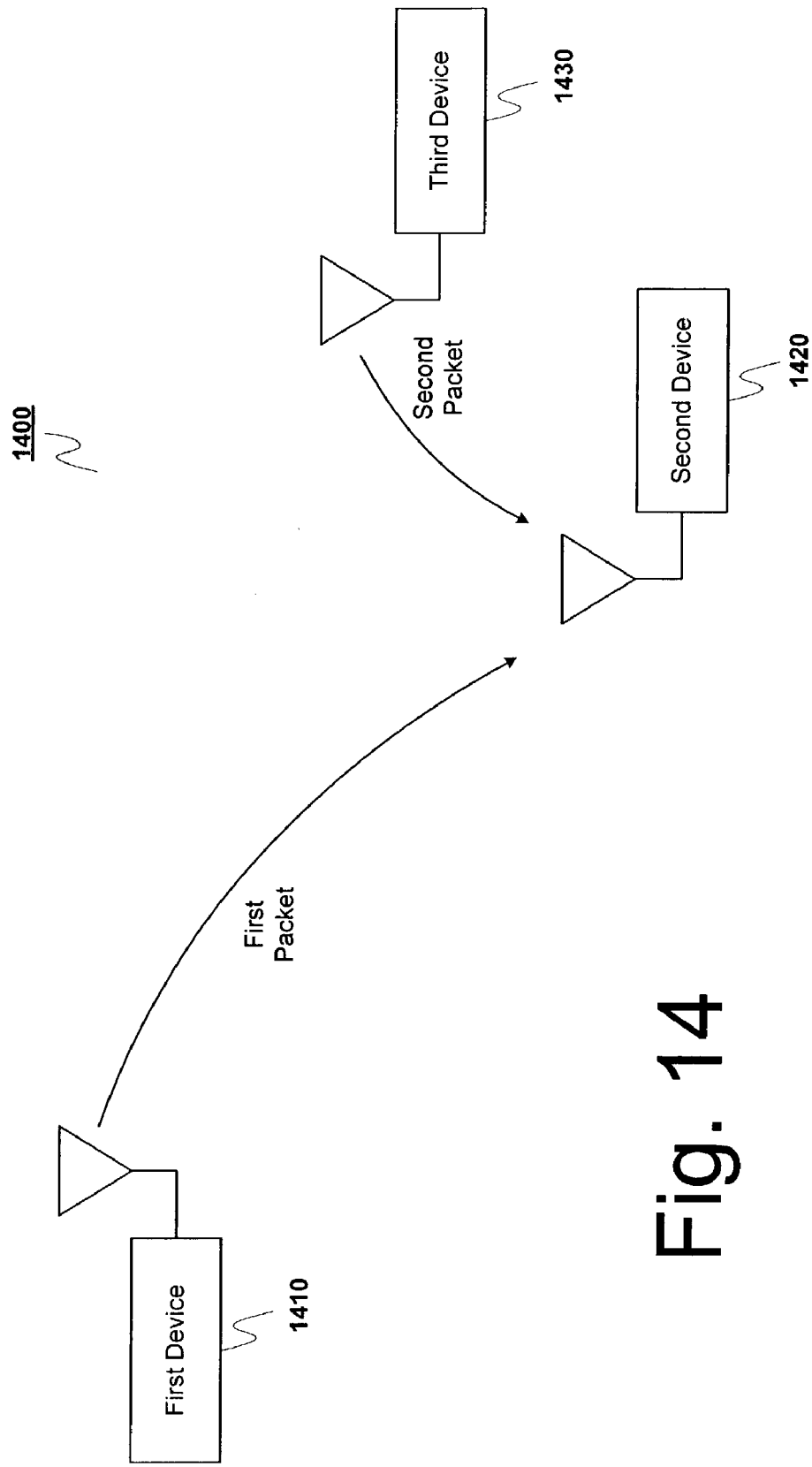
FIG. 14 is a block diagram showing a situation involving a near-far problem in a wireless network.

FIG. 14 is a block diagram showing a situation involving a near-far problem in a wireless network. As shown in FIG. 14, a first device 1410 sends a first packet to a second device 1420 (e.g., a data packet being sent during a time slot 540). The first device 1410 may require the second device 1420 to send an ACK frame in response to the sent packet.

However, a third device 1430, which is not in the same network as the first and second devices 1410 and 1420, is located close to the second device 1420, and is transmitting a second packet that interferes with the first packet. The second packet is not intended for the second device 1420, but given the nature of wireless communications, the second device 1420 will still receive the second packet. And if the power level of the second packet is significantly higher than the power level of the first packet, it can interfere with the proper reception of the first packet.

In general, a device that has successfully acquired a signal (i.e., has identified an incoming signal) will associate an expected phase and code word with that incoming signal. For example, if the second device 420 of FIG. 14 has acquired a signal (a packet prior to the first packet) from the first device 1410, the second device 1420 will have determined an expected phase for that incoming signal and an expected code word associated with the signal. In other words, the second device 1420 expects to receive a series of pulses at a given phase, and formed into groups that indicate the code word or the inverse code word. As a result, the second device 1420 will divide the incoming pulses into N-bit sequences (where N is the length of the code word), and will correlate these N-bit sequences with the code word to decode the information encoded in the signal. (See, e.g., FIGS. 9-12.)

If there is no interference, then the second device 1420 should have no trouble receiving the data sent by the first device 1410. However, if the third device 1430 is also sending a signal (e.g., the second packet), it is possible that this interfering signal will prevent the second device 1420 from properly receiving the intended signal (e.g., the first packet) from the first device 1410.

As noted with respect to FIGS. 8 to 10, the transmitted signals are preferably comprised of a string of UWB pulses formed into code words. These pulses each exist for a set time, and the time in between the pulses is dead time (i.e., there is nothing being transmitted). Thus, if the phase that the third device 1430 is transmitting at is not in line with the phase that the first device 1410 is transmitting at, then interference between the two signals will not occur.

Figure 15:
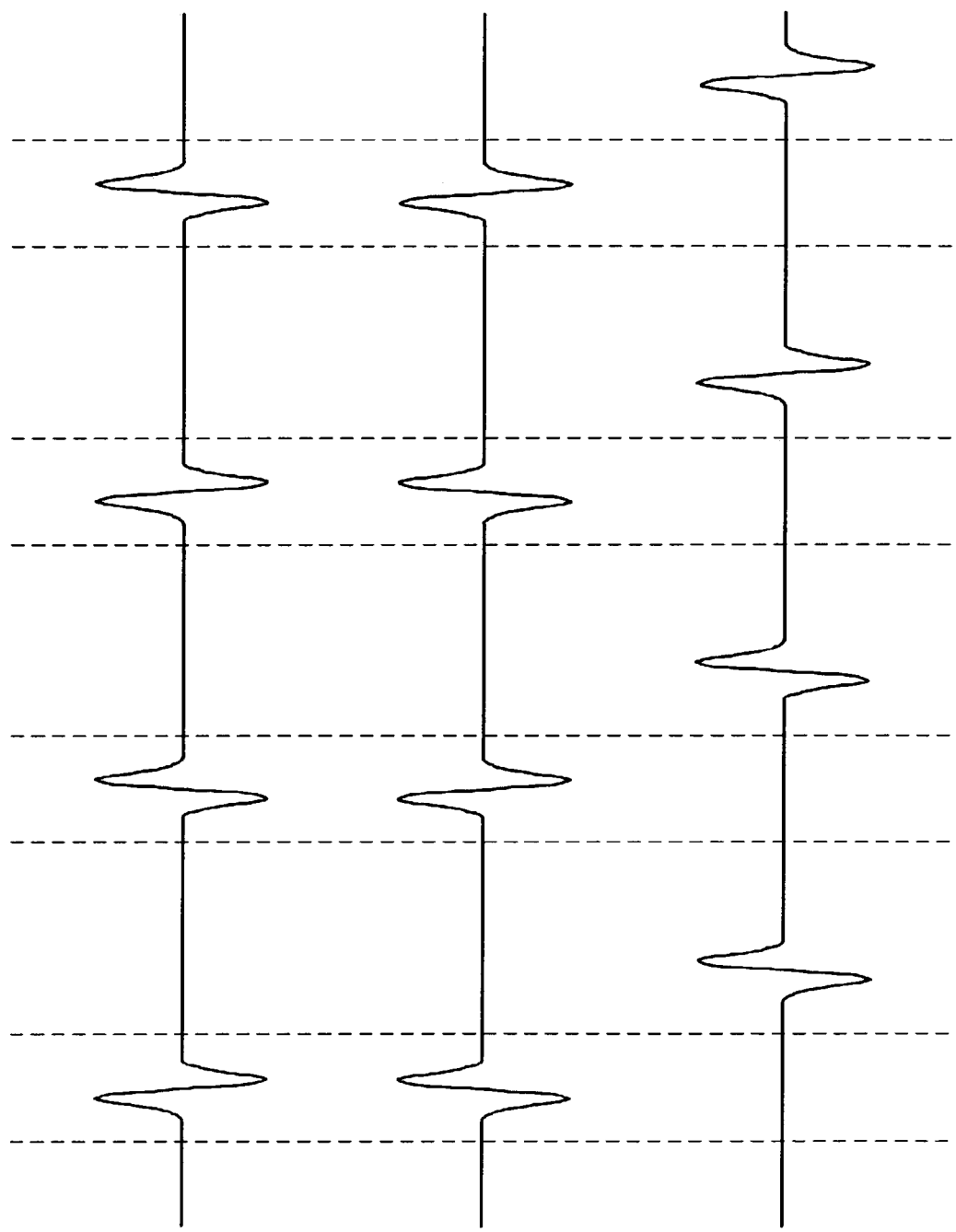
FIGS. 15A to 15C are graphs of the signal and code word phases for an out-of-phase interfering device.

FIGS. 15A to 15C are graphs of the signal and code word phases for an out-of-phase interfering device. In particular, FIG. 15A is a graph of the code word provided to the mixer 1220 of the second device 1420; FIG. 15B is a graph of the incoming signal received at the second device 1420 from the first device 1410; and FIG. 15C is a graph of the incoming signal received at the second device 1420 from the third device 1430. As shown in FIGS. 15A to 15C, regardless of the strength of the signal received at the second device 1420 from the third device 1430, it will not interfere with the signal received at the second device 1420 from the first device 1410 because the two are out of phase. In other words, when the second device 1420 is performing its correlation between the code word and the signal received from the first device 1410, the signal received from the third device 1430 has a value of zero.

However, it is possible that by chance the phase of the signal transmitted by the first device 1410 will be in phase with the signal transmitted by the third device 1430. In this case, interference between the two is possible.

Figure 16:
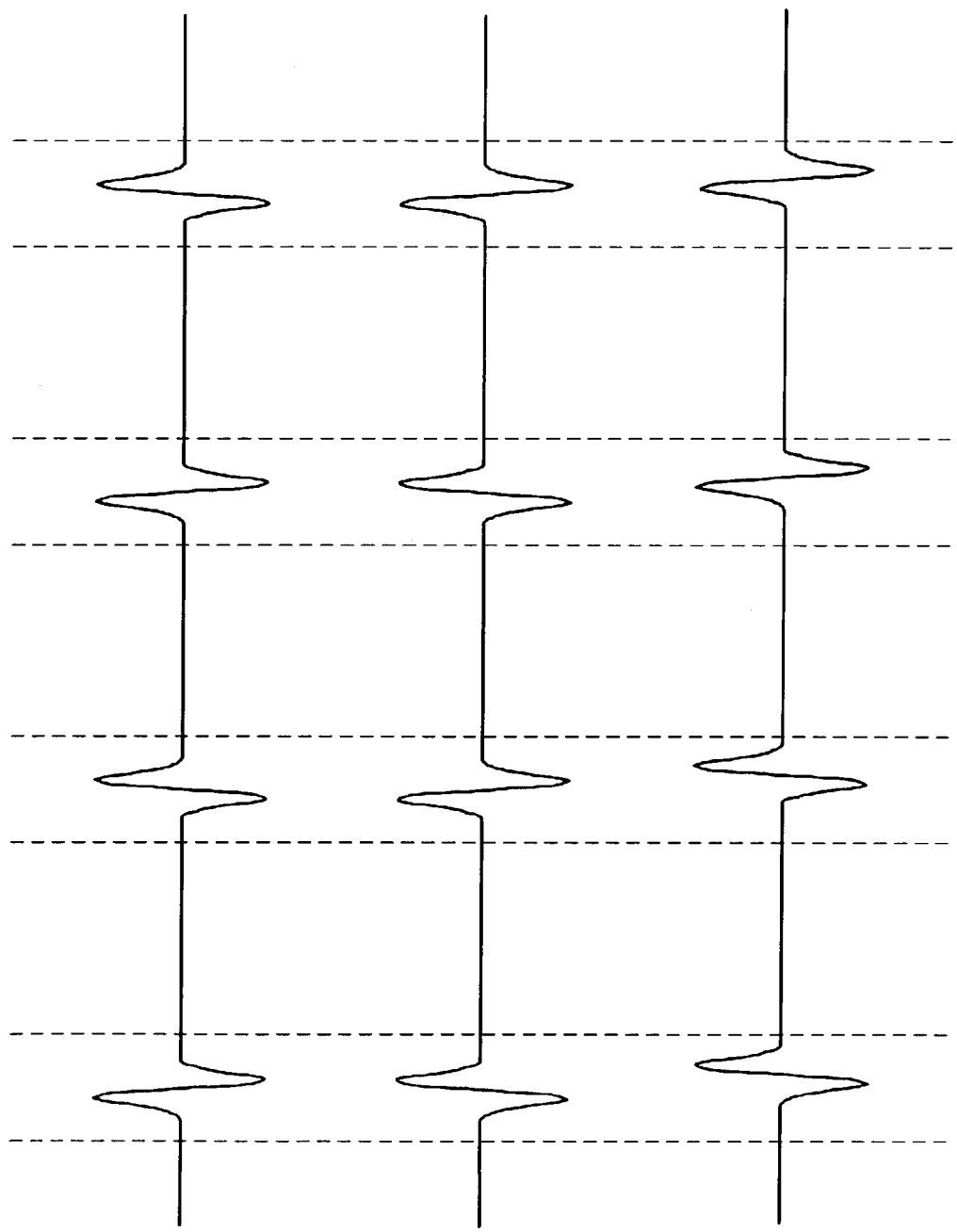
FIGS. 16A to 16C are graphs of the signal and code word phases for an in-phase interfering device.

FIGS. 16A to 16C are graphs of the signal and code word phases for an in-phase interfering device. In particular, FIG. 16A is a graph of the code word provided to the mixer 1220 of the second device 1420; FIG. 16B is a graph of the incoming signal received at the second device 1420 from the first device 1410; and FIG. 16C is a graph of the incoming signal received at the second device 1420 from the third device 1430. As shown in FIGS. 16A to 16C, the signal received at the second device 1420 from the third device 1430 will not interfere with the signal received at the second device 1420 from the first device 1410 because the two are in phase. In other words, when the second device is performing its correlation between the locally-generated code word and the signal received from the first device 1410, the value of the signal received from the third device 1430 will potentially cause an erroneous correlation value to be determined.

One reason this interference could be particularly troublesome is if the third device 1430 is significantly-closer to the second device 1420 than the first device 1410. In this case, the power level of the signal received at the second device from the third device will be significantly larger than the power level of the signal received at the second device from the first device 1410. Since these signals will be effectively added together at the second device 1420, they will both affect the correlation result. And if the signal from the third device 1430 overwhelms the signal from the first device 1410, then an incorrect correlation result can be generated.

Table 4 shows the relative contributions of the bits received from the first device and the bits received from the third device on the resulting correlation value according to an exemplary situation. In this example, it is assumed that the power level of the bits received from the third device 1430 are five times the power level of the code word locally generated at the second device 1420, and the bits received from the first device 1410 are equal to the power level of the code word locally generated at the second device 1420. In this example a single correlation threshold of zero is used.

Because the amplitude of the pulses from the closer third device 1430 are so much greater than the amplitude of the pulses from the first device 1410, the signal from the third device 1430 has a much greater influence on the correlation value in the second device. Thus, instead of providing a correlation value that indicates a "0" (i.e., a negative number) the mixer 1210 in the second device 1420 outputs a correlation value indicates a "1" (i.e., a positive value). The reverse could be true for a bit value of "1," with the interfering signal causing the correlation result to be negative, indicating a "0" value.

cross correlation characteristics. Such a change in codes could result from a sufficient shift in phase (e.g., shifting an entire chipping period by one chip, i.e., one pulse in the code word), or by actually changing the codes used in that network. In the latter case, this may require cooperation of a higher layer (though the attempt would still originate from the MAC layer 420).

Figure 17:
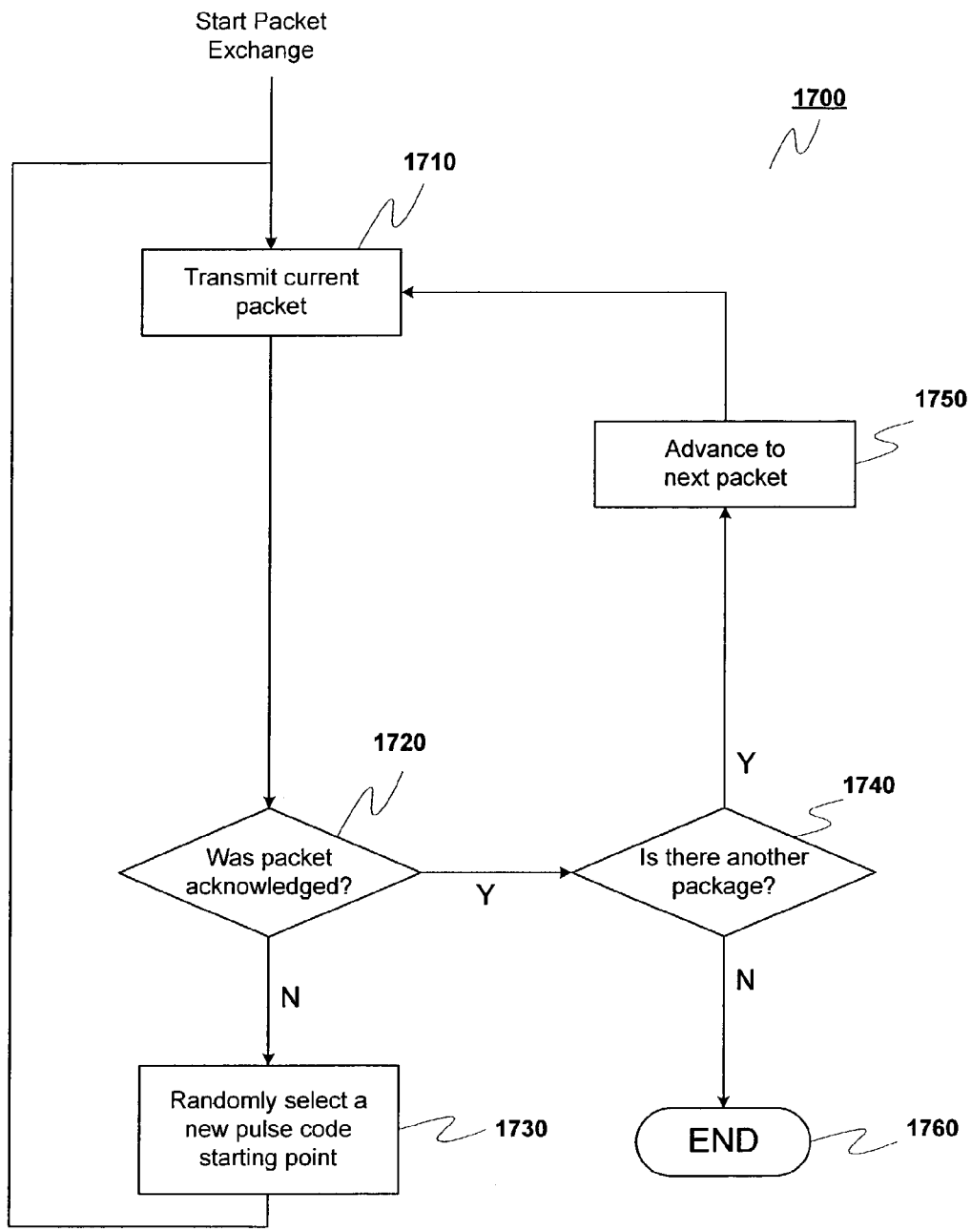
FIG. 17 is a flow chart showing the operation of the MAC layer in a transmitting device addressing the near-far problem according to a preferred embodiment of the present invention.

FIG. 17 is a flow chart showing the operation of the MAC layer in a transmitting device addressing the near-far problem according to a preferred embodiment of the present invention. As shown in FIG. 17, the process initiates when the transmitting device starts a packet exchange. This process assumes that all of the transmitted packets require an acknowledgement. If this is not the case, then the process shown in FIG. 17 will only be performed for those packets that require an ACK packet in reply.

The transmitting device begins by transmitting a current packet to a receiving device. (Step 1710) The transmitting device then determines whether that packet was acknowledged by the receiving device. (Step 1720)

TABLE 4

Near-Far Interference

| Code Word | −1 | −1 | +1 | −1 | +1 | −1 | +1 | −1 | −1 | +1 | −1 | +1 | +1 | |
|---|---|---|---|---|---|---|---|---|---|---|---|---|---|---|
| Bits Received from 1st Device | +1 | +1 | −1 | +1 | −1 | +1 | −1 | +1 | +1 | −1 | +1 | −1 | −1 | |
| Bits Received from 3rd Device | −5 | +5 | −5 | +5 | +5 | −5 | +5 | −5 | −5 | +5 | +5 | −5 | +5 | |
| 1st Correlation | −1 | −1 | −1 | −1 | −1 | −1 | −1 | −1 | −1 | −1 | −1 | −1 | −1 | −13 |
| 3rd Correlation | 5 | −5 | −5 | −5 | 5 | 5 | 5 | 5 | 5 | 5 | −5 | −5 | 5 | 15 |
| | | | | | | | | | | | | | | +2 Total |

In alternate examples, if separate positive and negative thresholds are used the power levels of the various received signals could also cause a correlation result that indicated no valid data when the data was actually a "1" or a "0." In this case, the weights from the interfering signal could push the correlation value to between the two thresholds.

One way the transmitting device (e.g., the first device 1410) could discover the interference is through lack of proper acknowledgement. Often when the first device 1410 sends a packet to the second device 1420, it requests that the second device 1420 send an acknowledgement (ACK) packet in return. If the second device 1420 does not send an ACK packet in response to a data packet, then the first device 1410 can suspect that there is a problem with reception. And if it detects a problem with reception in this manner, the first device 1410 will assume that the problem may be caused by a near-far situation and will take appropriate corrective measures.

In that case, to correct the problem, the transmitting device (e.g., the first device 1410) should do-something to reduce the cross correlation between the transmitted code and the interfering code. In one embodiment it could select a new starting phase for the pulse code in each transmission packet. This will increase the chance that the pulses transmitted by the first device will be out of phase with any interfering signals (e.g., the signal from the third device). Preferably this new starting phase will be selected at random to minimize the chance of further interference (i.e., to make the signals look more like FIGS. 15A to 15C than like FIGS. 16A to 16C). In an alternate embodiment, it could change the transmitted code in an attempt to find one that had better If the transmitted packet was not acknowledged, the transmitting device assumes there is some interference and randomly selects a new pulse code starting point (i.e., it randomly alters the phase of the transmitted pulse codes). (Step 1730) After altering the pulse code starting point, the transmitting device then returns to Step 1710 and sends the current packet again at the new phase.

In alternate embodiments, Step 1730 can be anything that would change the cross correlation characteristics between the transmitted code word and the interfering code word. For example, it could involve changing the code words used by the network containing the transmitting device.

If the transmitted packet was acknowledged, the transmitting device determines whether there is another packet to be sent. (Step 1740) If there is another packet, the transmitting device advances to the next packet (Step 1750) and transmits it. Step (1710)

If there are no more packets, the packet exchange ends. (Step 1760)

If all of the packets are successfully transmitted in this manner, then the MAC layer 420 has successfully corrected the interference problem. However, in some instances, the MAC layer 420 will be unsuccessful and interference will remain despite the efforts of the PHY layers 410 to choose good codes and the MAC layers 420 to randomly move the network's transmission phase. In this case the management entity layer 440 can act to try and cure the interference problem.

Management Entity Layer

Preferably, the management entity layer 440 will not take action to address interference from another network unless the PHY layer 410 and the MAC layer 420 have been at least partially successful in their attempts to correct the problem. Thus, in a preferred embodiment, the management entity layer 440 will only act once the network is functioning at some level (i.e., suffering interference, but still transmitting at sub-optimal performance). Alternate embodiments could have the management entity layer 440 act sooner.

In an effort to solve the interference problem, the management entity layer 440 will determine whether it is possible for the interfering networks to either merge into a single, larger network, or to timeshare the available channel as separate networks. This will allow them to avoid interference by sharing the available transmission channel as a single network. In order for a merger to be possible, several criteria must be met.

The first requirement is that the coordinators for each of the networks must not be hidden from each other. In other words, the coordinators for each network must be within the usable physical area 540 of each of the other networks. The reason for this is to allow communication between a new coordinator that controls the combined network, and the remaining devices in the new network.

Ideally all of the devices would be within the usable physical area of one of the coordinators, which can then become the new network coordinator. However, if that is not the case, a timesharing arrangement can be implemented with one coordinator directing the timesharing, and all of the other coordinators following the timesharing scheme.

Regardless of which alternative is used, the coordinators of each of the existing networks will have to be able to talk to each other to pass data. In order for this to be true, each must be within the usable physical area of each of the others. If any one coordinator cannot talk to any other coordinator, then the merging of the networks or the timesharing of the channel will not be possible, since the networks cannot communicate with each other to coordinate either event.

A second requirement is that the data being passed over the individual networks be able to tolerate sharing the bandwidth. If the separate networks are using significantly high portions of the bandwidth that they won't be able to share the current channel and still transmit the required amount of data, then the networks cannot be merged.

A third requirement is that the signal-to-noise ratio (SNR) at each device in a merged network must remain high enough to support the required quality of service (QoS) for the network. If the merger of the multiple networks will drop the SNR at any device to an unacceptably low value, then the merger will not be allowed.

However, if all of these requirements are met, then despite the difficulties in merging multiple networks, this could be an effective solution for interference problems. In this case, the networks can be merged/timeshared. Merging multiple networks will require management packets to be passed between devices and the new coordinator and between coordinators; and timesharing will require management packets to be passed between coordinators. As noted above, this requires increased overhead to implement. But if it solves the interference problem, then it may be worth the added trouble.

Figure 18:
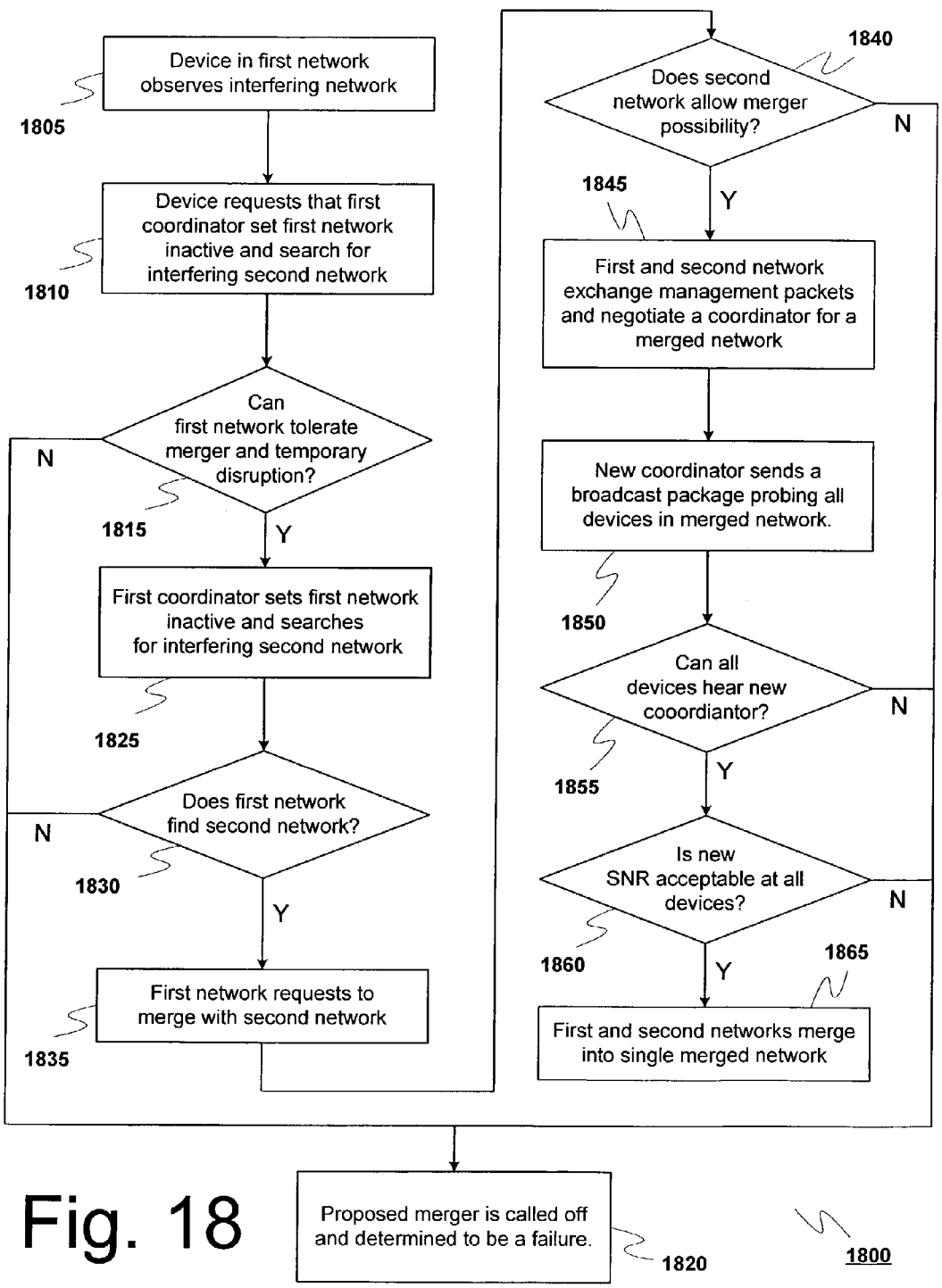
FIG. 18 is a flowchart showing a method of merging two networks according to a preferred embodiment of the present invention.

FIG. 18 is a flowchart showing a method of merging two networks according to a preferred embodiment of the present invention. As shown in FIG. 18, a device in a first network begins by observing in its PHY layer 410 that there is likely another network interfering with it. (Step 1805)

The device then requests that the coordinator of its network (e.g., a first coordinator of a first network) temporarily put the first network into an inactive state, and search for the other, interfering network (e.g., a second network). (Step 1810)

The first network then determines whether it can tolerate both merger and a temporary disruption of its data flow. (Step 1815) If it cannot (e.g., it has too much time-critical data that cannot be delayed), then the proposed merger is called off and the attempt is determined to be a failure. (Step 1820) If, however, first network can tolerate a temporary disruption of data flow, then the first coordinator sets the first network inactive and listens for the beacon from the second network. (Steps 1825 and 1830)

If the first network does not find the second network after a reasonable amount of time, then the proposed merger is called off and the attempt is determined to be a failure. (Step 1820) In this case, the interference problem is local to the complaining device and that device will have to endure the interference using the countermeasures available at the PHY layer 410 and the MAC layer 420.

If, however, the first network finds the second network, it requests to merge with the second network. (Step 1835) The first network could accomplish this, for example, by during the CAP period or an appropriate management time slot.

Upon receiving the request for merger, the second coordinator if the second network must determine if the second network will allow the merger. (Step 1840)

If the second coordinator determines that a merger is not possible, then the proposed merger is called off and the attempt is determined to be a failure. (Step 1820) This could happen, for example, if the second coordinator determines that the bandwidth used by both devices is too great to allow a merger.

If the second coordinator will allow the merger, then the first and second coordinators exchange management packets and negotiate who will be the coordinator of the new, merged network. (Step 1845) (In some embodiments, this new coordinator could be another device, separate from the current first and second coordinators. This might happen, e.g., when a device in the first or second network is better situated to be the coordinator of a new, merge network.

The new coordinator of the merged network then broadcasts a probing packet that is sent to all devices, checking to make sure all devices in the merged network can adequately "hear" the new coordinator and that their SNR will remain at an acceptable level in the merged network. (Step 1850)

The new coordinator listens for responses from all of the devices to determine if they all can properly hear the new coordinator. (Step 1855) If either a response is not received from any device, or a device indicates that it cannot properly hear the coordinator, then the proposed merger is called off and the attempt is determined to be a failure. (Step 1820)

In their responses, to the probing packet, the devices indicate whether they will have an adequate SNR for signals from the new coordinator to maintain the required QoS. (Step 1860) If any device answers no, then the proposed merger is called off and the attempt is determined to be a failure. (Step 1820)

However, if all stations can hear the new coordinator and are satisfied with the resulting SNR, then the merger proceeds and a new, merged network is formed from the first and second networks. (Step 1865)

Combined Method of Addressing Interference

Thus, a combined method is provided for addressing interference in adjacent or overlapping networks. This method involves the PHY layer 410, the MAC layer 420, and the management entity layer 420.

Figure 19:
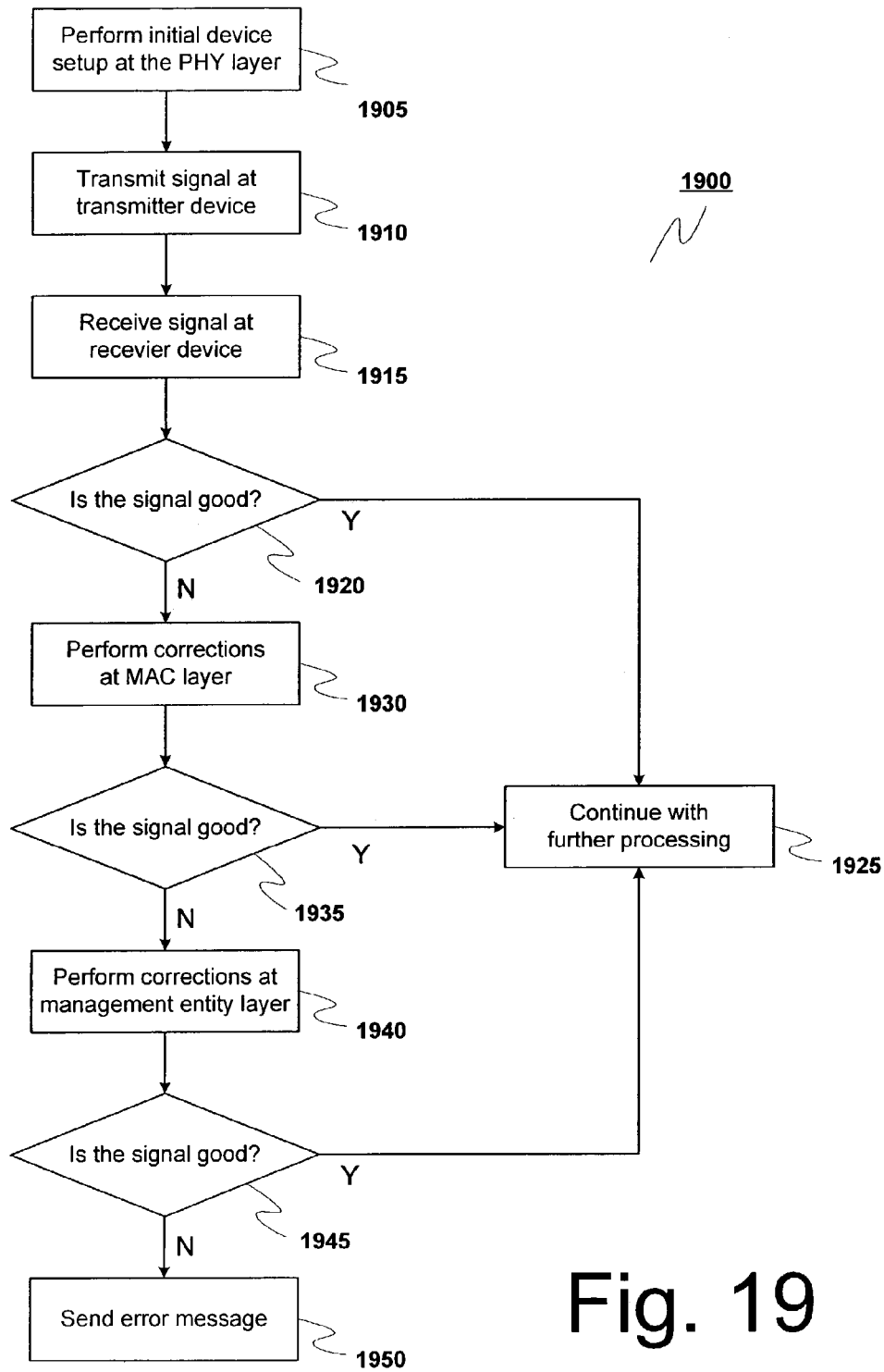
FIG. 19 is a flowchart showing a process of addressing network interference according to a preferred embodiment of the present invention.

FIG. 19 is a flowchart showing a process of addressing network interference according to a preferred embodiment of the present invention. As shown in FIG. 19, the network starts at the PHY layer 410 of the transmitter, making a careful code selection for the codes that will be used at the PHY layer 410 of all of the devices in the network. (Step 1905)

The action at the PHY layer 410 is preferably elementary and allows no adaptive process. In other words, effort is made to initially choose codes that will minimize interference. However, once the network starts operation, the codes cannot be changed without action being taken by to a higher layers.

A transmitting device in the network then uses the code determined at the PHY layer 410 to send a signal. (Step 1910) That signal is received at the receiver. (Step 1915), which determines whether the signal is good or bad. (Step 1920)

If the signal is of a good quality then the network need do nothing more and can proceed with further processing. (Step 1925)

If the signal is of a bad quality, then the network will try and fix the problem at the MAC layer 420 by taking some action that will minimize the interference, preferably by trying to minimize the cross correlation characteristics between the transmitted signal and the interfering signal. (Step 1930) For example, the transmitter can shift the pulse phase (e.g., by several hundred picoseconds) to try to keep the pulses from aligning with pulses form the interfering device, or it could try and alter the code words used by the network that contains the transmitter. In this latter case, cooperation from higher layers may be required.

The receiver will then determine whether the signal is good after this change in phase. (Step 1935)

If the signal is of a good quality then the network need do nothing more and can proceed with further processing. (Step 1925)

However, if despite the best efforts of the MAC layer 420, the interference problem remains, then management entity layer 440 will attempt to fix the interference problem. (Step 1940) The main option available to the management entity layer 440 is to try and take two interfering networks and merge them into a single network or two or more timesharing networks The management entity layer 440 in a device can request that the coordinator of the network send management packets to the coordinator of the interfering network to suggest that a merger occur. Then, if the coordinators agree and the necessary criteria are met, then the networks can merge.

If the merger progresses, then the interference is likely to disappear, since there is no longer an interfering network. However, this step may determine that no mergers are possible. Therefore, after this step, the receiver will again determine whether the signal is good after this change in phase. (Step 1945)

If the signal is of a good quality then the network need do nothing more and can proceed with further processing. (Step 1925)

If the signal is still of poor quality, then the network may have to simply give up and send an error message to the user indicating that there is poor signal quality. (Step 1950) This can either indicate that the desired level of signal quality or transmission rate cannot continue, or that the network can no longer continue to function, depending upon the severity of the interference.

In alternate embodiments the management entity layer 440 solution could allow certain devices to be dropped in order to allow the merger of multiple networks or the timesharing of the channel by multiple networks. Consider the example of a first network with four devices and a second network with six devices. If the coordinator of the first network can access five of the second network's six devices and the coordinator of the second network can access all four of the first network's devices, the merger might go forward, dropping the sixth device from the second network.

This could be done in a situation where it is better than nine devices communicate and one get dropped than that a larger number of devices (e.g., one entire network) be shut down. In one embodiment, devices could be prioritized with an absolute and a relative priority. A potential network merger could look to drop any device of a certain absolute priority, and could determine individual devices to drop by relative priority within a given absolute priority. This would allow the minimum number of devices to be dropped. Some devices could be even be given a priority that would not allow it to be dropped at all.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Obviously, numerous modifications and variations of the present invention are possible in light of the above teachings. It is therefore to be understood that within the scope of the appended claims, the invention may be practiced otherwise than as specifically described herein.

I claim:

1. A method of limiting interference in a local wireless network, comprising:

transmitting a first wireless signal within the local wireless network using a first set of transmission parameters;

performing a first signal analysis to determine whether the signal quality of the first wireless signal is above a quality threshold;

adjusting the first set of transmission parameters in the local wireless network to a second set of transmission parameters if the signal quality is below the quality threshold;

transmitting a second wireless signal within the local wireless network using the first set of transmission parameters if the signal quality is determined to be above the quality threshold in the step of performing a first signal analysis; and transmitting a second wireless signal within the local wireless network using the second set of transmission parameters if the signal quality is determined to be below the quality threshold in the step of performing a first signal analysis, wherein the first transmission parameters include a first transmission phase and a first set of code words used to encode data, wherein the second transmission parameters include a second transmission phase and a second set of code words used to encode data, and wherein the second transmission phase is the same as the first transmission phase and the second set of code words is different from the first set of code words.

2. A method of limiting interference in a local wireless network, as recited in claim 1,
wherein the first set of code words has first cross correlation parameters such that correlation between any two of the first set of code words produces a first correlation value greater than an expected correlation value between two random code words, and
wherein the second set of code words has second cross correlation parameters such that correlation between any two of the second set of code words produces a second correlation value greater than the expected correlation, value between two random code words.

3. A method of limiting interference in a local wireless network, as recited in claim 1, further comprising:
performing a second signal analysis to determine whether the signal quality of the second wireless signal is above the quality threshold;
detecting whether a remote wireless network is in proximity with the local wireless network if the signal quality is below the quality threshold;
determining whether a merger of the local wireless network and the remote wireless network is acceptable, if the remote wireless network is detected; and
merging the local wireless network with the interfering wireless network if the determining step shows that the merger is acceptable.

4. A method of limiting interference in a local wireless network, as recited in claim 3, further comprising performing an error handling procedure if either detecting step does not detect the remote wireless network or the determining step shows that the merger is not acceptable.

5. A method of limiting interference in a local wireless network, as recited in claim 3,
wherein the first set of code words has first cross correlation parameters such that correlation between any two of the first set of code words produces a first correlation value greater than an expected correlation value between two random code words, and
wherein the second set of code words has second cross correlation parameters such that correlation between any two of the second set of code words produces a second correlation value greater than the expected correlation value between two random code words.

6. A method of limiting interference in a local wireless network, comprising:
transmitting a first wireless signal within the local wireless network using a first set of transmission parameters;
performing a first signal analysis to determine whether the signal quality of the first wireless signal is above a quality threshold;
adjusting the first set of transmission parameters in the local wireless network to a second set of transmission parameters if the signal quality is below the quality threshold;
transmitting a second wireless signal within the local wireless network using the first set of transmission parameters if the signal quality is determined to be above the quality threshold in the step of performing a first signal analysis; and
transmitting a second wireless signal within the local wireless network using the second set of transmission parameters if the signal quality is determined to be below the quality threshold in the step of performing a first signal analysis,
wherein the first transmission parameters include a first transmission phase and a first set of code words used to encode data,
wherein the second transmission parameters include a second transmission phase and a second set of code words used to encode data, and
wherein the second transmission phase is different from the first transmission phase and the second set of code words is different from the first set of code words.

7. A method of limiting interference in a local wireless network, as recited in claim 6, wherein a difference between the second transmission phase and the first transmission phase is determined in a random manner.

8. A method of limiting interference in a local wireless network, as recited in claim 6,
wherein the first set of code words has first cross correlation parameters such that correlation between any two of the first set of code words produces a first correlation value greater than an expected correlation value between two random code words, and
wherein the second set of code words has second cross correlation parameters such that correlation between any two of the second set of code words produces a second correlation value greater than the expected correlation value between two random code words.

9. A method of limiting interference in a local wireless network, comprising:
transmitting a first wireless signal within the local wireless network using a first set of transmission parameters;
performing a first signal analysis to determine whether the signal quality of the first wireless signal is above a quality threshold;
adjusting the first set of transmission parameters in the local wireless network to a second set of transmission parameters if the signal quality is below the quality threshold;
transmitting a second wireless signal within the local wireless network using the first set of transmission parameters if the signal quality is determined to be above the quality threshold in the step of performing a first signal analysis; and
transmitting a second wireless signal within the local wireless network using the second set of transmission parameters if the signal quality is determined to be below the quality threshold in the step of performing a first signal analysis,
performing a second signal analysis to determine whether the signal quality of the second wireless signal is above the quality threshold;
detecting whether a remote wireless network is in proximity with the local wireless network if the signal quality is below the quality threshold;
determining whether a merger of the local wireless network and the remote wireless network is acceptable, if the remote wireless network is detected; and
merging the local wireless network with the interfering wireless network if the determining step shows that the merger is acceptable.

10. A method of limiting interference in a local wireless network, as recited in claim 9, further comprising performing an error handling procedure if either detecting step does not detect the remote wireless network or the determining step shows that the merger is not acceptable.

11. A method of limiting interference in a total wireless network, as recited in claim 9, wherein the first transmission parameters include a first transmission phase and a first set of code words used to encode data, wherein the second transmission parameters include a second transmission phase and a second set of code words used to encode data, and wherein the second transmission phase is different from the first transmission phase and the second set of code words is the same as the first set of code words.

* * * * *

UNITED STATES PATENT AND TRADEMARK OFFICE
CERTIFICATE OF CORRECTION

| | | |
|---|---|---|
| PATENT NO. | : 7,333,814 B2 | Page 1 of 1 |
| APPLICATION NO. | : 10/379998 | |
| DATED | : March 6, 2003 | |
| INVENTOR(S) | : Richard D. Roberts | |

It is certified that error appears in the above-identified patent and that said Letters Patent is hereby corrected as shown below:

In Column 25, Line 12, Claim No. 2:

Change "correlation, value between two random code words." to --correlation value between two random code words.--

In Column 26, Line 66, Claim No. 11:

Change "A method of limiting interference in a total wireless" to --A method of limiting interference in a local wireless--

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,333,814 B2  Page 1 of 1
APPLICATION NO. : 10/379998
DATED : February 19, 2008
INVENTOR(S) : Richard D. Roberts It is certified that error appears in the above-identified patent and that said Letters Patent is hereby corrected as shown below:

In Column 25, Line 12, Claim No. 2:

Change "correlation, value between two random code words." to --correlation value between two random code words.--

In Column 26, Line 66, Claim No. 11:

Change "A method of limiting interference in a total wireless" to --A method of limiting interference in a local wireless--

This certificate supersedes the Certificate of Correction issued July 29, 2008.

Signed and Sealed this

Twenty-sixth Day of August, 2008

JON W. DUDAS
*Director of the United States Patent and Trademark Office*